US008953152B2

(12) United States Patent
Min et al.

(10) Patent No.: US 8,953,152 B2
(45) Date of Patent: Feb. 10, 2015

(54) DEPTH SENSORS, DEPTH INFORMATION ERROR COMPENSATION METHODS THEREOF, AND SIGNAL PROCESSING SYSTEMS HAVING THE DEPTH SENSORS

(75) Inventors: Dong Ki Min, Seoul (KR); Young Gu Jin, Gyeonggi-do (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 310 days.

(21) Appl. No.: 13/427,028

(22) Filed: Mar. 22, 2012

(65) Prior Publication Data

US 2012/0242975 A1    Sep. 27, 2012

(30) Foreign Application Priority Data

Mar. 24, 2011 (KR) ........................ 10-2011-0026166

(51) Int. Cl.
*G01C 3/08* (2006.01)
*G01S 17/89* (2006.01)
*H04N 13/02* (2006.01)
*G01S 7/497* (2006.01)
*G01S 7/481* (2006.01)
*G01S 7/491* (2006.01)
*G01B 11/22* (2006.01)

(52) U.S. Cl.
CPC ............ *G01S 17/89* (2013.01); *H04N 13/0207* (2013.01); *H04N 13/0271* (2013.01); *G01S 7/497* (2013.01); *G01S 7/4816* (2013.01); *G01S 7/4915* (2013.01); *G01B 11/22* (2013.01); *G01S 7/4914* (2013.01)
USPC ....... 356/5.03; 356/3.01; 356/4.01; 356/5.01; 356/6

(58) Field of Classification Search
USPC ............ 356/3.01–3.15, 4.01–4.1, 5.01–5.15, 356/6–22, 28, 28.5, 139.01–139.1
See application file for complete search history.

(56) References Cited

U.S. PATENT DOCUMENTS

| 5,715,043 | A | * | 2/1998 | Hasegawa et al. | ........... 356/3.14 |
|---|---|---|---|---|---|
| 7,944,548 | B2 | * | 5/2011 | Eaton | ........................ 356/5.01 |
| 8,648,945 | B2 | * | 2/2014 | Ovsiannikov et al. | ........ 348/294 |
| 2005/0078297 | A1 | * | 4/2005 | Doemens et al. | ............ 356/5.04 |
| 2008/0231832 | A1 | * | 9/2008 | Sawachi | ....................... 356/5.1 |
| 2009/0091653 | A1 | * | 4/2009 | Kageyama et al. | ........... 348/441 |
| 2010/0051836 | A1 | * | 3/2010 | Kim | ............................ 250/574 |

(Continued)

FOREIGN PATENT DOCUMENTS

JP    2005-258954 A    9/2005
JP    2009094593 A    4/2009

(Continued)

*Primary Examiner* — Luke Ratcliffe
*Assistant Examiner* — Assres H Woldemaryam
(74) *Attorney, Agent, or Firm* — Harness, Dickey & Pierce, P.L.C.

(57) ABSTRACT

According to at least one example embodiment, a depth information error compensation method includes outputting modulated light to a target object, detecting a plurality of first pixel signals at different detection time points in a first time interval, the first pixel signals representing light reflected from the target object during the first time interval, detecting a plurality of second pixel signals at different detection time points in a second time interval, the second pixel signals representing light reflected from the target object during the second time interval, comparing each of the plurality of first pixel signals with each of the plurality of second pixel signals and calculating depth information to the target object according to the comparing.

15 Claims, 27 Drawing Sheets

(56) References Cited

U.S. PATENT DOCUMENTS

2011/0051119 A1* 3/2011 Min et al. .................. 356/5.1
2011/0080471 A1* 4/2011 Song et al. .................. 348/46

FOREIGN PATENT DOCUMENTS

| KR | 1020080051015 A | 6/2008 |
| KR | 20100025228 A | 3/2010 |

* cited by examiner

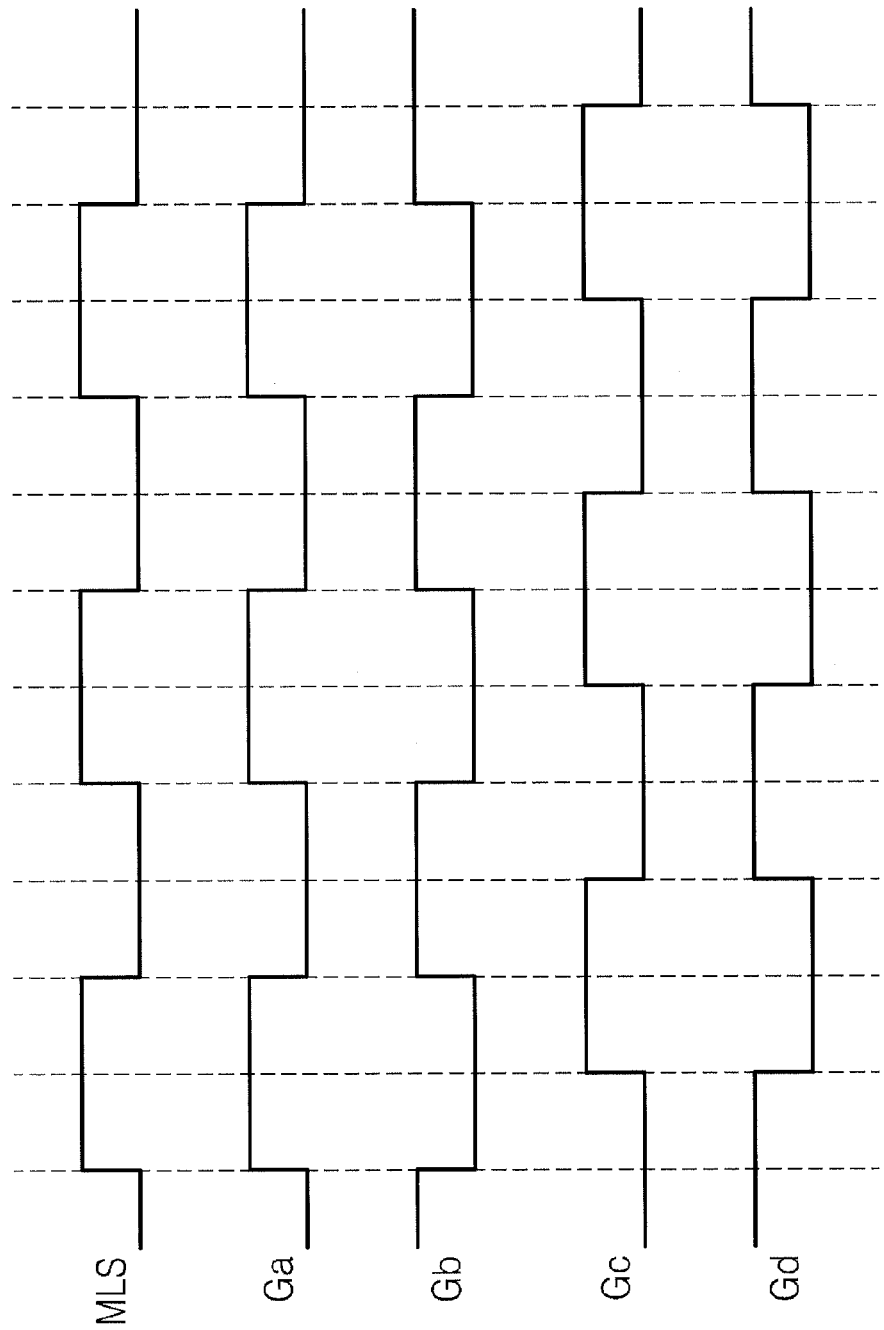

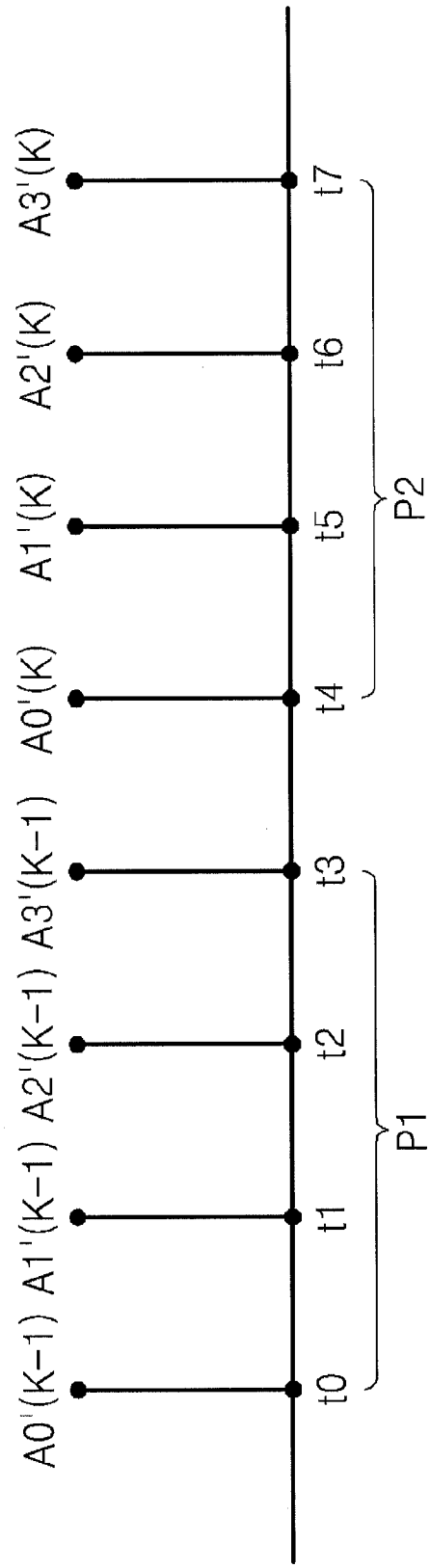

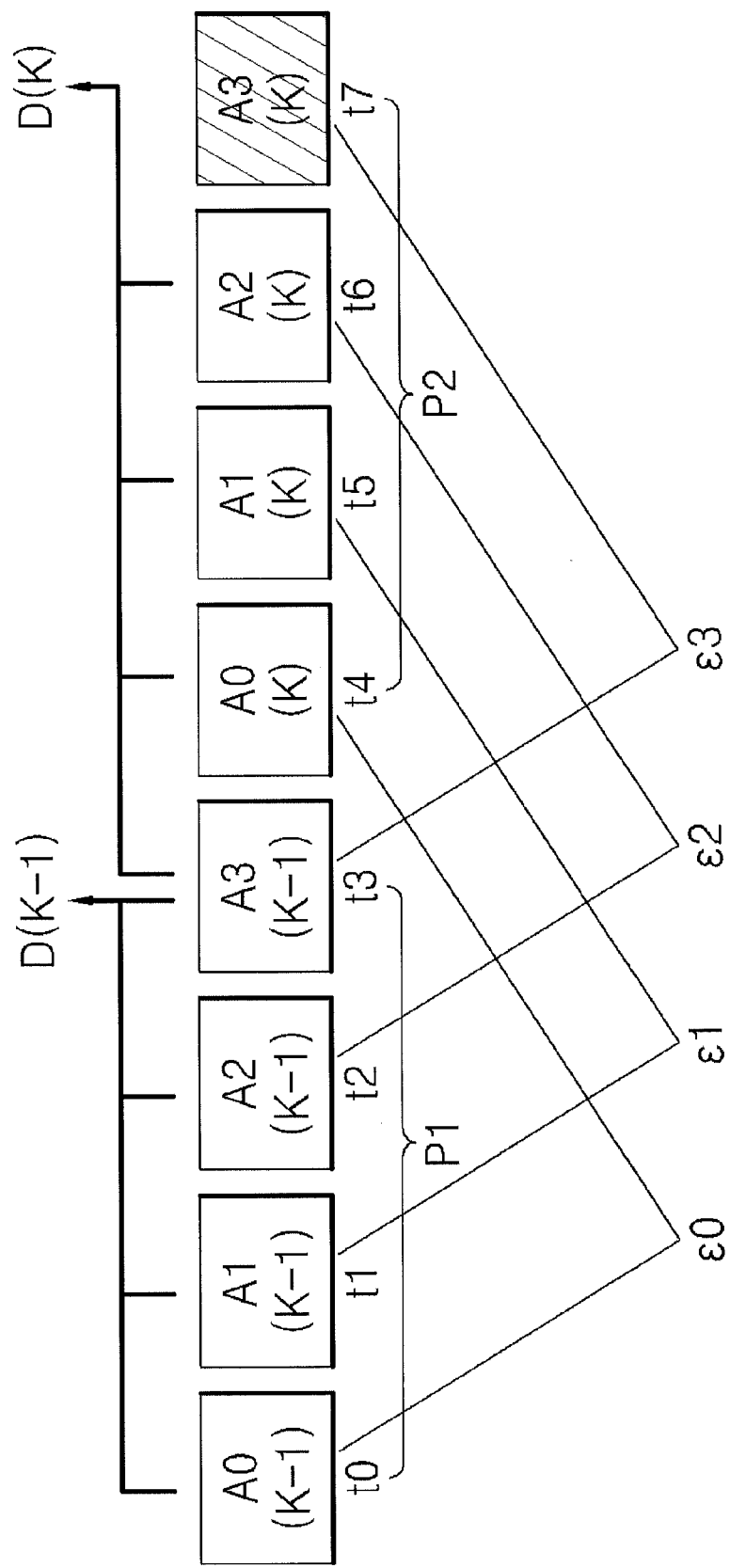

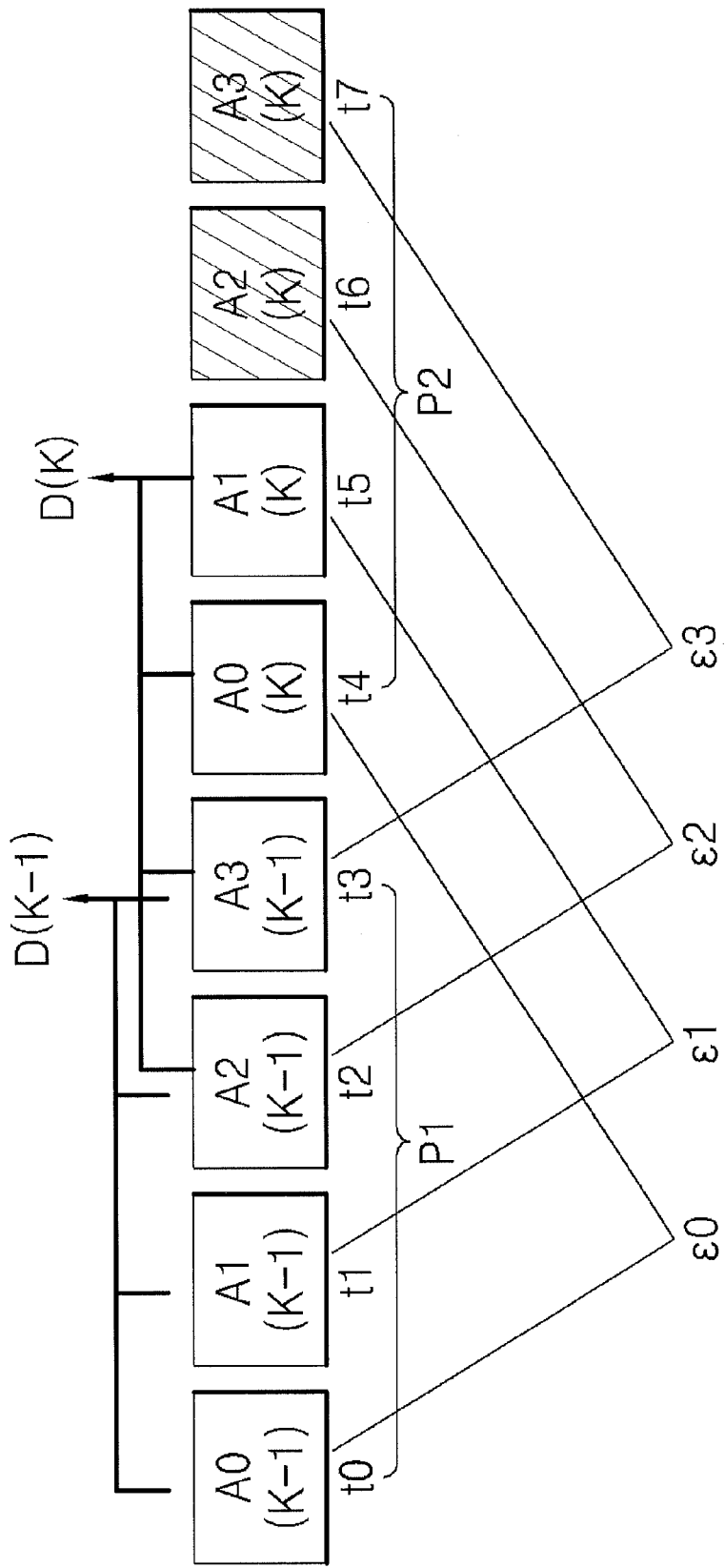

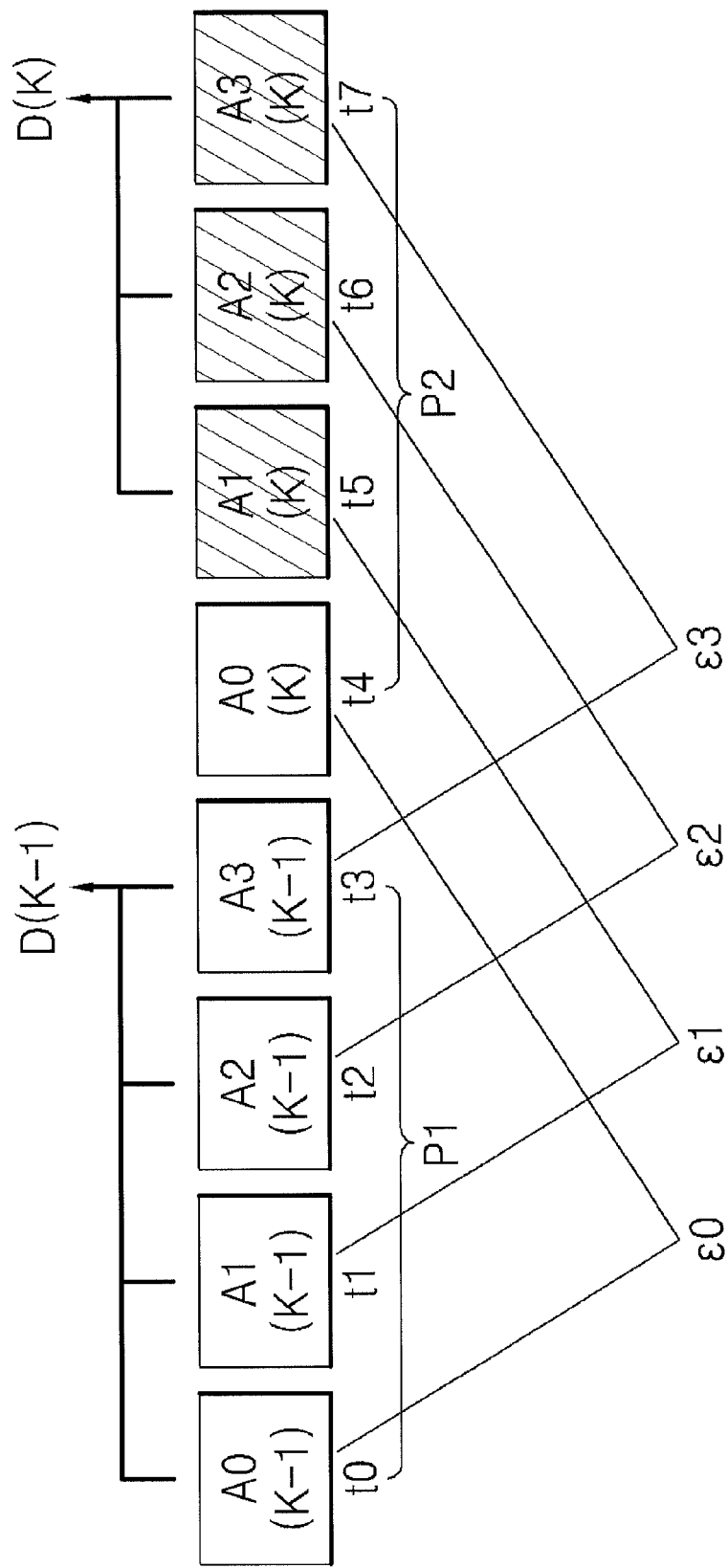

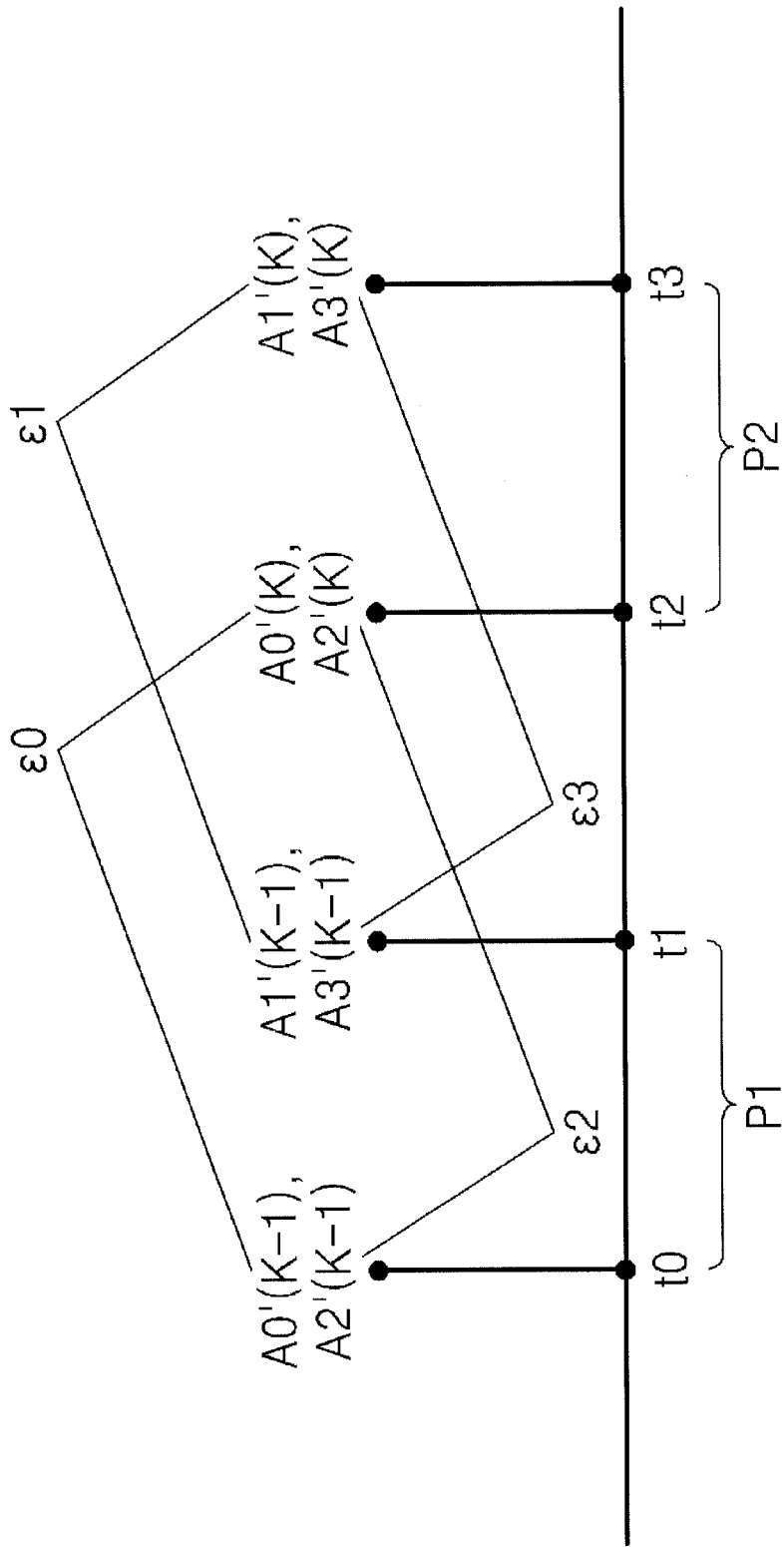

FIG. 16A
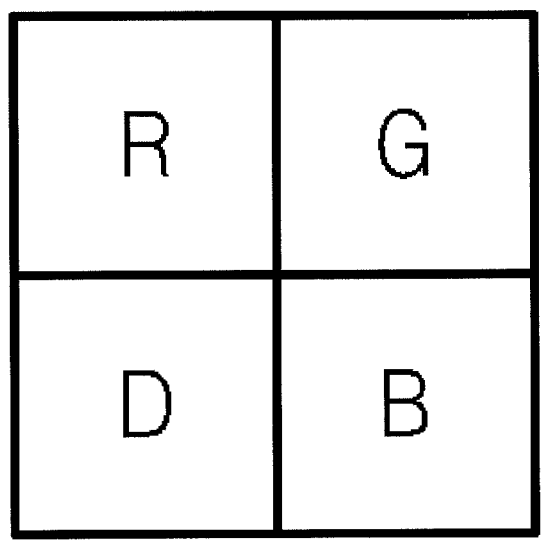

FIG. 16B 522-2

| R | R | G | G |
|---|---|---|---|
| D | D | B | B |

DEPTH SENSORS, DEPTH INFORMATION ERROR COMPENSATION METHODS THEREOF, AND SIGNAL PROCESSING SYSTEMS HAVING THE DEPTH SENSORS

CROSS-REFERENCE TO RELATED APPLICATIONS

This application claims priority under 35 U.S.C. §119 to Korean Patent Application No. 10-2011-0026166, filed on Mar. 24, 2011, the entire contents of which are hereby incorporated by reference.

BACKGROUND

Example embodiments of inventive concepts relate to depth information calculation, and more particularly, to a depth sensor using a time of flight (TOF) principle, depth information error compensation methods thereof and signal processing systems including the depth sensors.

When a depth sensor using time of flight (TOF) does not detect a plurality of pixel signals simultaneously by using a plurality of signals having a phase difference of 0°, 90°, 180° and 270°, the depth sensor may detect the plurality of pixel signals by using the plurality of signals having the phase difference by time lag.

However, while the depth sensor detects the plurality of pixel signals by using the plurality of signals having the phase difference by time lag and when a target object moves quickly or laterally, the depth sensor may measure depth information including a depth information error.

SUMMARY

Inventive concepts provide a depth sensor which may compare each of a plurality of pixel signals detected in different time intervals with each other and compensate for a depth information error according to the comparison results, a depth information error compensation method thereof, and a signal processing system having the same.

At least one example embodiment of inventive concepts is directed to a depth information error compensation method including outputting modulated light to a target object, first detecting a plurality of first pixel signals at different detection time points in a first time interval, the first pixel signals representing light reflected from the target object during the first time interval, second detecting a plurality of second pixel signals at different detection time points in a second time interval, the second pixel signals representing light reflected from the target object during the second time interval, comparing each of the plurality of first pixel signals with each of the plurality of second pixel signals and calculating depth information to the target object according to the comparing.

The first and second detecting includes accumulating electrons which are generated for phase differences of a photo gate control signal of the depth pixel of 0°, 90°, 180° or 270°.

The calculating depth information to the target object includes generating a plurality of comparative values based on the comparing, determining if each of the plurality of comparative values is greater than a threshold value, calculating a phase difference according to the determining and calculating the depth information based on a frequency of the reflected light during the first and second time intervals and the phase difference.

If the depth pixel has a one-tap pixel configuration, the calculating a phase difference includes, calculating the phase difference using the plurality of second pixel signals if each of the plurality of comparative values is smaller than the threshold value.

If the depth pixel has a one-tap pixel configuration and one of the plurality of comparative values is greater than the threshold value, the calculating a phase difference includes, compensating a depth information error to the target object using the plurality of second pixel signals, or calculating the phase difference using pixel signals except for the first and second pixel signals corresponding to the one comparative value exceeding the threshold.

If the depth pixel has a one-tap pixel configuration and if two of the plurality of comparative values are greater than the threshold value, the calculating a phase difference calculates the phase difference, using first and second pixel signals except for two first pixel signals corresponding to the two comparative values, respectively, and two second pixel signals corresponding to the two comparative values, respectively.

If the depth pixel has a one-tap pixel configuration, the calculating a phase difference includes, if three of the plurality of comparative values are greater than the threshold value, calculating the phase difference using three second pixel signals corresponding to the three comparative values, respectively.

If the depth pixel has a one-tap pixel configuration, the calculating a phase difference includes, calculating the phase difference using the plurality of second pixel signals if each of the plurality of comparative values is greater than the threshold value.

If the depth pixel has a two-tap pixel configuration and each of the plurality of comparative values is smaller than the threshold value, the calculating a phase difference calculates the phase difference using the plurality of second pixel signals.

If the depth pixel has a two-tap pixel configuration and one or two of the plurality of comparative values are greater than the threshold value, the calculating a phase difference includes, calculating the phase difference using first and second pixel signals except for two first pixel signals corresponding to the two comparative values, respectively, and two second pixel signals corresponding to the two comparative values, respectively.

If the depth pixel has a two-tap pixel configuration and three or more of the plurality of comparative values are greater than the threshold value, the calculating a phase difference includes, calculating the phase difference using the plurality of second pixel signals.

An example embodiment is directed to a depth sensor, including a light source configured to output modulated light to a target object, a depth pixel configured to detect a plurality of first pixel signals at different detection time points in a first time interval and detect a plurality of second pixel signals at different detection time points in a second time interval, the first and second pixel signals representing light reflected from the target object, a digital circuit configured to convert each of the plurality of first pixel signals and the plurality of second pixel signals into a plurality of first digital pixel signals and a plurality of second digital pixel signal, respectively, a memory configured to store the plurality of first digital pixel signals and the plurality of second digital pixel signals, and a depth error compensator configured to compare the plurality of first digital pixel signals with the plurality of second digital pixel signals, respectively, and calculate depth information to the target object according to the comparison results.

The depth error compensator is configured to generate comparative values based on the comparison results, determine if each of a plurality of comparative values is greater than a threshold value, calculate a phase difference according to the determination results, and calculate the depth information based on a frequency of the reflected light and the phase difference.

If the depth pixel has a one-tap pixel configuration and each of the plurality of comparative values is smaller than the threshold value, the depth error compensator is configured to calculate the phase difference using the plurality of second digital pixel signals.

If the depth pixel has a one-tap pixel configuration and one of the plurality of comparative values is greater than the threshold value, the depth error compensator is configured to compensate a depth information error to the target object using the plurality of second digital pixel signals or calculate the phase difference using digital pixel signals except for a first digital pixel signal corresponding to the one comparative value and a second digital pixel signal corresponding to the one comparative value.

If the depth pixel has a one-tap pixel configuration and if two of the plurality of comparative values are greater than the threshold value, the depth error compensator is configured to calculate the phase difference using digital pixel signals except for two first digital pixel signals corresponding to the two comparative values, respectively, and two second digital pixel signals corresponding to the two comparative values, respectively.

If the depth pixel has a one-tap pixel configuration and three of the plurality of comparative values are greater than the threshold value, the depth error compensator is configured to calculate the phase difference using second digital pixel signals corresponding to the three comparative values, respectively.

If the depth pixel has a one-tap pixel configuration and each of the plurality of comparative values is greater than the threshold value, the depth error compensator is configured to calculate the phase difference using the plurality of second digital pixel signals.

If the depth pixel has a two-tap pixel configuration and each of the plurality of comparative values is smaller than the threshold value, the depth error compensator is configured to calculate the phase difference using the plurality of second digital pixel signals.

If the depth pixel has a two-tap pixel configuration and one or two of the plurality of comparative values are greater than the threshold value, the depth error compensator is configured to calculate the phase difference using digital pixel signals except for two first digital pixel signals corresponding to the two comparative values, respectively, and two second digital pixel signals corresponding to the two comparative values, respectively.

If the depth pixel has a two-tap pixel configuration, and three or more of the plurality of comparative values are greater than the threshold value, the depth error compensator is configured to calculate the phase difference using the plurality of second digital pixel signals.

At least one example embodiment is directed to a signal processing system, including a depth sensor and a processor for controlling an operation of the depth sensor. The depth sensor includes a light source configured to output modulated light to a target object, a depth pixel configured to detect a plurality of first pixel signals at different detection time points in a first time interval and detect a plurality of second pixel signals at different detection time points in a second time intervals, the first and second pixel signals representing light reflected from the target object, a digital circuit configured to convert each of the plurality of first pixel signals and the plurality of second pixel signals into each of a plurality of first digital pixel signals and a plurality of second digital pixel signals, a memory configured to store the plurality of first digital pixel signals and the plurality of second digital pixel signals, and a depth error compensator configured to compare the plurality of first digital pixel signals with the plurality of second digital pixel signals, respectively, and calculate depth information to the target object according to the comparison results.

At least one example embodiment is directed to a three-dimensional image sensor, including a light source configured to output modulated light to a target object, a pixel array, which includes a depth pixel, the depth pixel configured to detect a plurality of first pixel signals at different detection time points in a first time interval and detecting a plurality of second pixel signals at different detection time points in a second time interval, the first and second pixel signals representing light reflected from the target object, the pixel array further including red, green and blue (RGB) pixels configured to output RGB pixel signals, and an image signal processor configured to generate three-dimensional image information. The image signal processor is configured to compare a plurality of first digital pixel signals converted from the plurality of first pixel signals and a plurality of second digital pixel signals converted from the plurality of second pixel signals, respectively, and generate the three-dimensional image information based on depth information to the target object according to comparison results and RGB digital signals corresponding to the RGB pixel signals.

Another example embodiment discloses a method of operating an image sensor, the method including obtaining a plurality of first pixel signals during a first time interval, the first pixel signals representing light reflected from an object during time points in the first time interval, obtaining a plurality of second pixel signals during a second time interval, the second pixel signals representing light reflected from the object during time points in the second time interval, generating values based on the plurality of first pixel signals and the plurality of second pixel signals, determining if at least one of the values is below a threshold and determining a phase difference based on whether at least one of the values exceeds a threshold, the phase difference representing a phase difference between at least one of the first and second pixel signals and a control signal generated by the image sensor.

BRIEF DESCRIPTION OF THE DRAWINGS

These and/or other aspects and advantages of inventive concepts will become apparent and more readily appreciated from the following description of the embodiments, taken in conjunction with the accompanying drawings of which:

FIG. 4 is a timing diagram of photo gate control signals for controlling a photo gate included in the one-tap depth pixel illustrated in FIG. 1;

FIG. 5 is a timing diagram for explaining a plurality of pixel signals detected successively by using the one-tap depth pixel illustrated in FIG. 1;

FIG. 6B is another example of a diagram for explaining the method of calculating depth information by using the plurality of pixel signals detected successively using the one-tap depth pixel illustrated in FIG. 1;

FIG. 6C is still another example of a diagram for explaining the method of calculating depth information by using the plurality of pixel signals detected successively using the one-tap depth pixel illustrated in FIG. 1;

FIG. 6D is still another example of a diagram for explaining the method of calculating depth information by using the plurality of pixel signals detected successively using the one-tap depth pixel illustrated in FIG. 1;

FIG. 13 is a timing diagram for explaining a plurality of pixel signals detected successively by using the two-tap depth pixel illustrated in FIG. 9;

FIG. 16A is an example of a unit pixel array of a three-dimensional image sensor;

FIG. 16B is another example of the unit pixel array of the three-dimensional image sensor;

DETAILED DESCRIPTION OF EXAMPLE EMBODIMENTS

Figure 1:
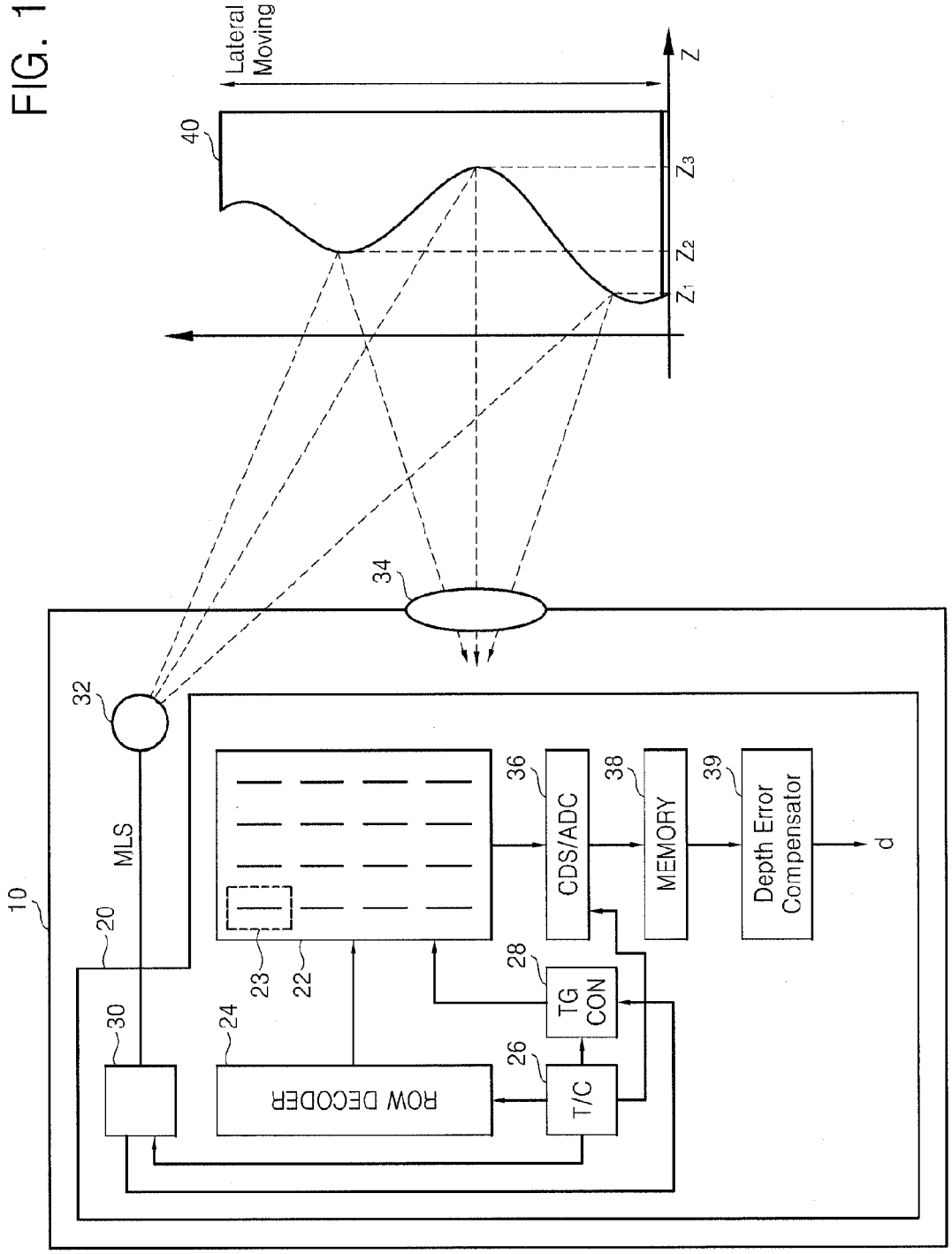
FIG. 1 is a block diagram of a depth sensor according to an example embodiment.

Various example embodiments will be described more fully hereinafter with reference to the accompanying drawings, in which some example embodiments are shown. Inventive concepts may, however, be embodied in many different forms and should not be construed as limited to the example embodiments set forth herein. Rather, these example embodiments are provided so that this disclosure will be thorough and complete, and will fully convey the scope of the inventive concepts to those skilled in the art. In the drawings, the sizes and relative sizes of elements may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the inventive concepts. As used herein, the singular forms "a," "an" and "the" are intended to include the plural forms as well, unless the context clearly indicates otherwise. It will be further understood that the terms "comprises", "comprising", "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
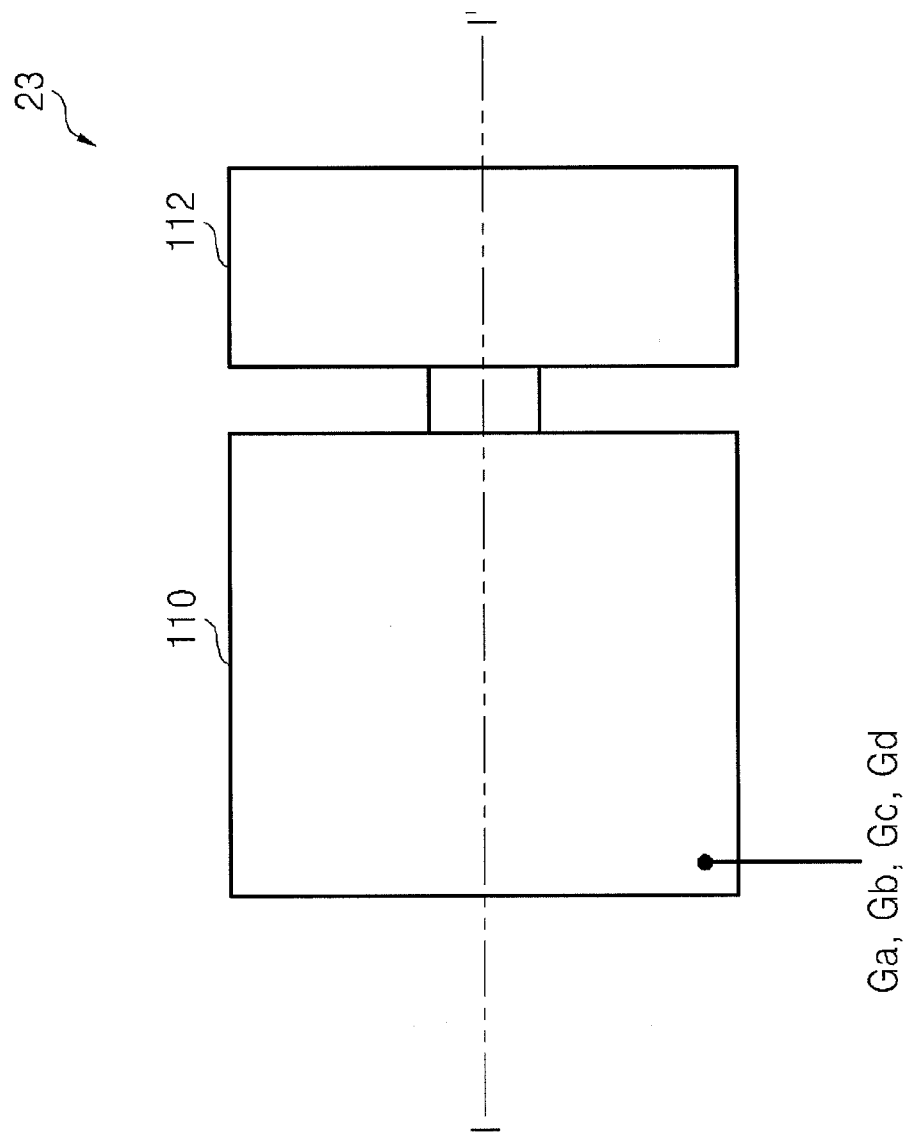
FIG. 2 is a plane diagram of a one-tap depth pixel illustrated in an array of FIG. 1.
Figure 3:
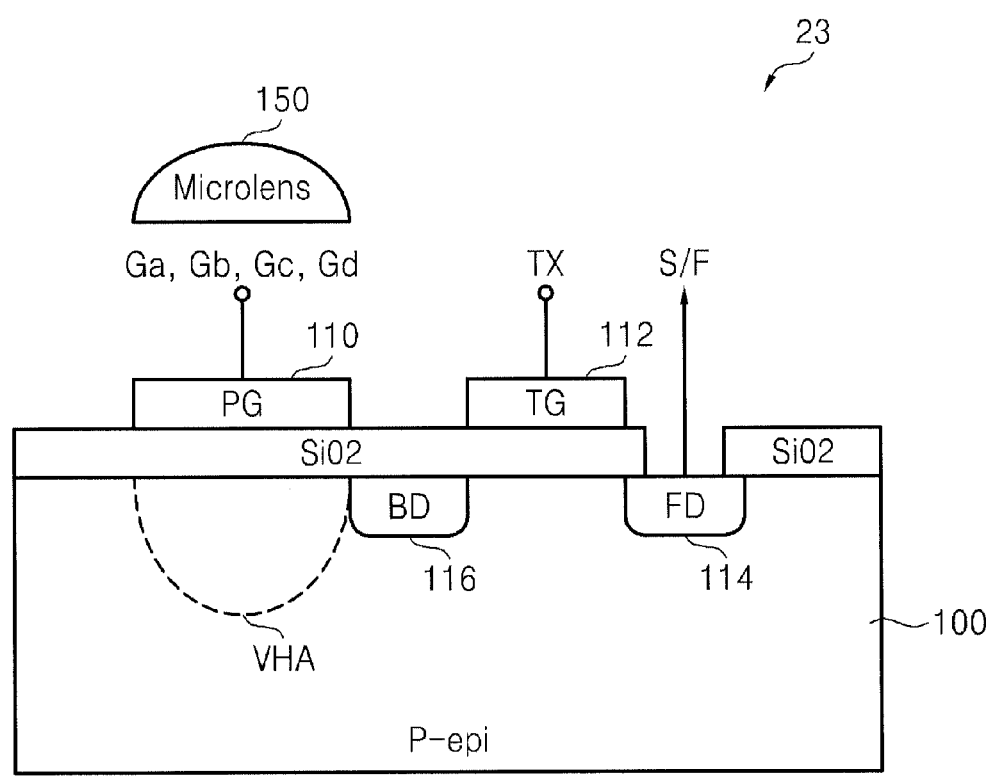
FIG. 3 is a cross sectional diagram cutting the one-tap depth pixel of FIG. 2 by I-I'.

FIG. 1 is a block diagram of a depth sensor according to an example embodiment, FIG. 2 is a plane diagram of a one-tap depth pixel illustrated in an array of FIG. 1, FIG. 3 is a cross-sectional diagram cutting the one-tap depth pixel of FIG. 2 by I-I', FIG. 4 is a timing diagram of a plurality of photo gate control signals for controlling a photo gate included in the one-tap depth pixel illustrated in FIG. 1, and FIG. 5 is a timing diagram for explaining a plurality of pixel signals detected successively by using the one-tap depth pixel illustrated in FIG. 1.

Referring to FIGS. 1 to 5, a depth sensor 10 which may measure distance or depth by using time of flight (TOF) principle includes a semiconductor chip 20 including an array 22 where a plurality of one-tap depth pixels (detectors or sensors) 23 are arranged, a light source 32, and a lens module 34.

Each of a plurality of one-tap depth pixels 23 which are two dimensionally embodied in the array 22 includes a photo gate 110. Besides, each of the plurality of one-tap depth pixels 23 includes a plurality of transistors for signal processing.

A row decoder 24 selects one of a plurality of rows in response to a row address output from a timing controller 26. Here, row means a set of a plurality of one-tap depth pixels which are arranged in an X direction in the array 22.

A photo gate controller 28 may generate a first photo gate control signal Ga and supply it to the array 22 under a control of the timing controller 26.

According to an example embodiment, after the first photo gate control signal Ga is supplied to the array 22, the photo gate controller 28 may generate photo gate control signals, e.g., a second photo gate control signal Gb, a third photo gate control signal Gc, and a fourth photo gate control signal Gd, and further supply them to the array 22 under a control of the timing controller 26 to increase reliability of distance measurement.

As illustrated in FIG. 4, a phase difference between the first photo gate control signal Ga and the third photo gate control signal Gc is 90°, a phase difference between the first photo gate control signal Ga and the second photo gate control signal Gb is 180°, and a phase difference between the first photo gate control signal Ga and the fourth photo gate control signal Gd is 270°.

A light source driver 30 may generate a clock signal MLS which may drive the light source 32 under a control of the timing controller 26.

The light source 32 emits a modulated optical signal to a target object 40 in response to the clock signal MLS. A light emitting diode (LED), an organic light emitting diode (OLED), an active-matrix organic light emitting diode (AMOLED) or a laser diode may be used as the light source 32. For convenience of explanation, the modulated optical signal is assumed to be the same as the clock signal MLS. The modulated optical signal may be a sine wave or a square wave.

The light source driver 30 supplies the clock signal MLS or information on the clock signal MLS to the photo gate controller 28. Accordingly, the photo gate controller 28 generates a first photo gate control signal Ga having the same phase as the clock signal MLS and a second photo gate control signal Gb having a phase difference of 180° from the clock signal MLS. In addition, the photo gate controller 28 generates a third photo gate controller Gc having a phase difference of 90° from the clock signal MLS and a fourth photo gate control signal Gd having a phase difference of 270° from the clock signal MLS. For example, the photo gate controller 28 and the light source driver 30 may be synchronized to each other and operate.

A photo gate 110 may be embodied in transparent poly silicon. According to an example embodiment, the photo gate 110 may be embodied in Indium tin oxide or tin-doped indium oxide (ITO), Indium Zinc Oxide (IZO) or Zinc Oxide (ZnO).

The photo gate 110 may pass through by near infrared ray input through a lens module 34.

A modulated optical signal output from the light source 32 is reflected from the target object 40, and a distance Z when the target object 40 has different distances Z1, Z2 and Z3 is calculated as follows.

For example, when a modulated optical signal, e.g., a clock signal MLS is cos ωt, and an optical signal incident to the one-tap depth pixel 23 or an optical signal detected by the one-tap depth pixel 23, e.g., A0', A1', A2' or A3', is cos(ωt+θ), a phase shift(θ) by time of flight (TOF) or a phase difference (θ) is as shown in equation 1.

$$\theta=2*\omega*Z/C=2*(2\pi f)*Z/C \quad \text{[Equation 1]}$$

Here, C is a light speed.

Accordingly, the distance Z from the light source 32 or the array 22 to the target object 40 is calculated as shown in equation 2. As will be described in more detail below, the distance Z may also be referred to as depth information D(K).

$$Z=\theta*C/(2*\omega)=\theta*C/(2*(2\pi f)) \quad \text{[Equation 2]}$$

A plurality of reflected optical signals is incident to the array 22 through the lens module 34. Here, the lens module 34 may include a lens and an infrared pass filter.

The depth sensor 10 includes a plurality of light sources arranged in a circle around the lens module 34, but only one light source 32 is illustrated for convenience of explanation.

A plurality of optical signals incident to the array 22 through the lens module 34 may be demodulated by the plurality of sensors 23. That is, optical signals incident to the array 22 through the lens module 34 may form an image.

Referring to FIGS. 2 to 4, a floating diffusion region 114 is formed inside a P type substrate 100. The floating diffusion region 114 may be connected to a gate of a driving transistor S/F. The driving transistor S/F may perform a function of a source follower. The floating diffusion region 114 may be doped with N type impurities.

Silicon oxide is formed on the P type substrate 100, the photo gate 110 is formed on the silicon oxide and a transfer transistor 112 is formed. The P type substrate 100 may be an epitaxial substrate doped with $P^-$.

The first photo gate control signal Ga is supplied to the photo gate 110 during an integration interval and it is called a charge collection operation. Additionally, a transmission control signal TX for transmitting optical charges, which are generated in the P type substrate 100 located at a lower part of the photo gate 110, to the floating diffusion region 114 is supplied to a gate of the transfer transistor 112 and it is called a charge transmission operation.

According to an example embodiment, a bridging diffusion region 116 may further be formed in the P type substrate 100 located between a lower part of the photo gate 110 and a lower part of the transfer transistor 112. The bridging diffusion region 116 may be doped with N type impurities.

Optical charges are generated by optical signals incident to inside the P type substrate 100 through the photo gate 110. When a transmission control signal TX having a first level, e.g., 1.0V, is supplied to a gate of the transfer transistor 112 and a first photo gate control signal Ga having a first level, e.g., 3.3V, is supplied to the photo gate 110, charges generated inside the P type substrate 100 are collected at the lower part of the photo gate 110, and collected charges are transmitted to the floating diffusion region 114 (e.g., when the bridging diffusion region 116 is not formed) or transmitted to the floating diffusion region 114 through the bridging diffusion region 116 (e.g., when the bridging diffusion region 116 is formed).

Here, VHA is a region where potentials or charges are accumulated when a first photo gate control signal Ga having a first level is supplied to the first photo gate 110.

Moreover, when a transmission control signal TX having a first level, e.g., 1.0V, is supplied to a date of the transfer transistor 112 and a first photo gate control signal Ga having a low level, e.g., 0V, is supplied to the photo gate 110, optical charges are generated inside the P type substrate 100 located at the lower part of the photo gate 110 but generated optical charges are not transmitted to the floating diffusion region 114.

A charge collection operation and a charge transmission operation when a second photo gate control signal Gb, a third photo gate control signal Gc, and a fourth photo gate control signal Gd are supplied to the photo gate 110 are similar to a charge collection operation and a charge transmission operation when a first photo gate control signal Ga is supplied to the photo gate 110.

The one-tap depth pixel 23 accumulates optical electrons or an optical charge during a fixed time, e.g., integration time, and outputs pixel signals A0' and A2' or A1' and A3' generated according to an accumulation result. Each pixel signal Ak' generated by each of the plurality of one-tap depth pixels 23 is as shown in equation 3.

$$Ak = \sum_{n=1}^{N} a_{k,n}$$ [Equation 3]

Here, k is 0 when a signal input to the photo gate 110 of the one-tap depth pixel 23 is a first photo gate control signal Ga, k is 1 when it is a third photo gate control signal Gc, k is 2 when it is a second photo gate control signal Gb, and k is 3 when it is a fourth photo gate control signal Gd.

In equation 3, $a_{k,n}$ indicates the number of optical electrons or optical charges occurred in the one-tap depth pixel 23 and N=fm*Tint when a $n^{th}$ gate signal, where n is a natural number, is supplied with a phase difference corresponding to k. Here, fm indicates a frequency of modulated infrared EL, and Tint indicates integration time. Pixel signals A0' and A2' or A1' and A3' generated according to the accumulation result are as shown in equations 4, 5, 6 and 7.

$$A0' \cong \alpha + \beta \cos \theta$$ [Equation 4]

$$A1' \cong \alpha - \beta \cos \theta$$ [Equation 5]

$$A2' \cong \alpha + \beta \sin \theta$$ [Equation 6]

$$A3' \cong \alpha - \beta \sin \theta$$ [Equation 7]

Here, each alpha of the equations 4, 5, 6 and 7 means amplitude and beta means an offset.

Referring to FIG. 5, the one-tap depth pixel 23 detects or estimates a plurality of first pixel signals A0'(K−1), A1'(K−1), A2'(K−1) and A3'(K−1) at different detection time points t0 to t3 during a first time interval P1. K represents an interval including pixel signals corresponding to gate control signals Ga, Gb, Gc and Gd.

That is, the one-tap depth pixel 23 detects a first pixel signal A0'(K−1) in response to a first photo gate control signal Ga having a phase difference of 0° at a first time point t0, detects a second pixel signal A1'(K−1) in response to a third photo gate control signal Gc having a phase difference of 90° at a second time point t1, detects a third pixel signal A2'(K−1) in response to a second photo gate control signal Gb having a phase difference of 180° at a third time point t3, and detects a fourth pixel signal A3'(K−1) in response to a fourth photo gate signal Gd having a phase difference of 270° at a fourth time point t3.

Likewise, the one-tap depth pixel 23 detects a plurality of second Pixel signals A0'(K), A1'(K), A2'(K) and A3'(K) at different detection time points t4 to t7 during a second time interval P2.

That is, the one-tap depth pixel 23 detects a fifth pixel signal A0' (K) in response to a first photo gate control signal Ga having a phase difference of 0° at a fifth time point t4, detects a sixth pixel signal A1'(K) in response to a third photo gate control signal Gc having a phase difference of 90° at a sixth time point t5, detects a seventh pixel signal A2'(K) in response to a second photo gate control signal Gb having a phase difference of 180° at a seventh time point t6, and detects an eighth pixel signal A3'(K) in response to a fourth photo gate signal Gd having a phase difference of 270° at an eighth time point t7.

Referring to FIG. 1, a digital circuit 36, i.e., a correlated double sampling(CDS)/analog to digital(ADC) circuit, performs a CDS operation and an ADC operation on each pixel signal A0'(K−1), A1'(K−1), A2'(K−1), A3'(K−1), A0'(K), A1' (K), A2'(K) and A3'(K) and outputs each digital pixel signal A0(K−1), A1(K−1), A2(K−1), A3(K−1), A0(K), A1(K), A2(K) and A3(K) under a control of the timing controller 26. The depth sensor 10 of FIG. 1 may further include active load circuits for transmitting pixel signals output from a plurality of column lines embodied in the array 22 to the CDS/ADC circuit 36.

A memory 38 which may be embodied in a buffer receives and stores each digital pixel signal A0(K−1), A1(K−1), A2(K−1), A3(K−1), A0(K), A1(K), A2(K) and A3(K) output from the CDS/ADC circuit 36.

An depth error compensator 39 compares each of a plurality of first digital pixel signals A0(K−1), A1(K−1), A2(K−1) and A3(K−1) with each of a plurality of second digital pixel signals A0(K), A1(K), A2(K) and A3(K), which are output from the memory 38 to calculate depth information D(K) in a second time interval. The comparative value $\epsilon n$ is as shown in equation 8.

$$\epsilon n = |An(K) - An(K-1)|$$ [Equation 8]

n is an integer equal to or more than 0.

The depth error compensator 39 generates a plurality of comparative values, e.g., a first comparative value $\epsilon 0$, a second comparative value $\epsilon 1$, a third comparative value $\epsilon 2$ and a fourth comparative value $\epsilon 3$.

The first comparative value $\epsilon 0$ is a value comparing a first pixel signal A0(K−1) among a plurality of first digital pixel signals with a fifth pixel signal A0(K) among a plurality of second digital pixel signals, the second comparative value $\epsilon 1$ is a value comparing a second pixel signal A1(K−1) among the plurality of first digital pixel signals with a sixth pixel signal A1(K) among the plurality of second digital pixel signals, the third comparative value $\epsilon 2$ is a value comparing a third pixel signal A2(K−1) among the plurality of first digital pixel signals with a seventh pixel signal A2(K) among the plurality of second digital pixel signals, and the fourth comparative value $\epsilon 3$ is a value comparing a fourth pixel signal A3(K−1) among the plurality of first digital pixel signals with an eighth pixel signal A3(K) among the plurality of second digital pixel signals.

The depth error compensator 39 determines if each of the plurality of comparative values $\epsilon 1$, $\epsilon 1$, $\epsilon 2$ and $\epsilon 3$ is greater than a threshold value $\epsilon th$. The depth error compensator 39 calculates a phase difference $\theta$ using the equation 9, as described below. That is, the depth error compensator 39 calculates the depth information based on a frequency of reflected light and the phase difference $\theta$.

The one-tap depth pixel 23 illustrated in FIG. 3 includes a micro lens 150 formed on the photo gate 110; however, the one-tap depth pixel 23 may not include the micro lens 150 according to other example embodiments.

Figure 6A:
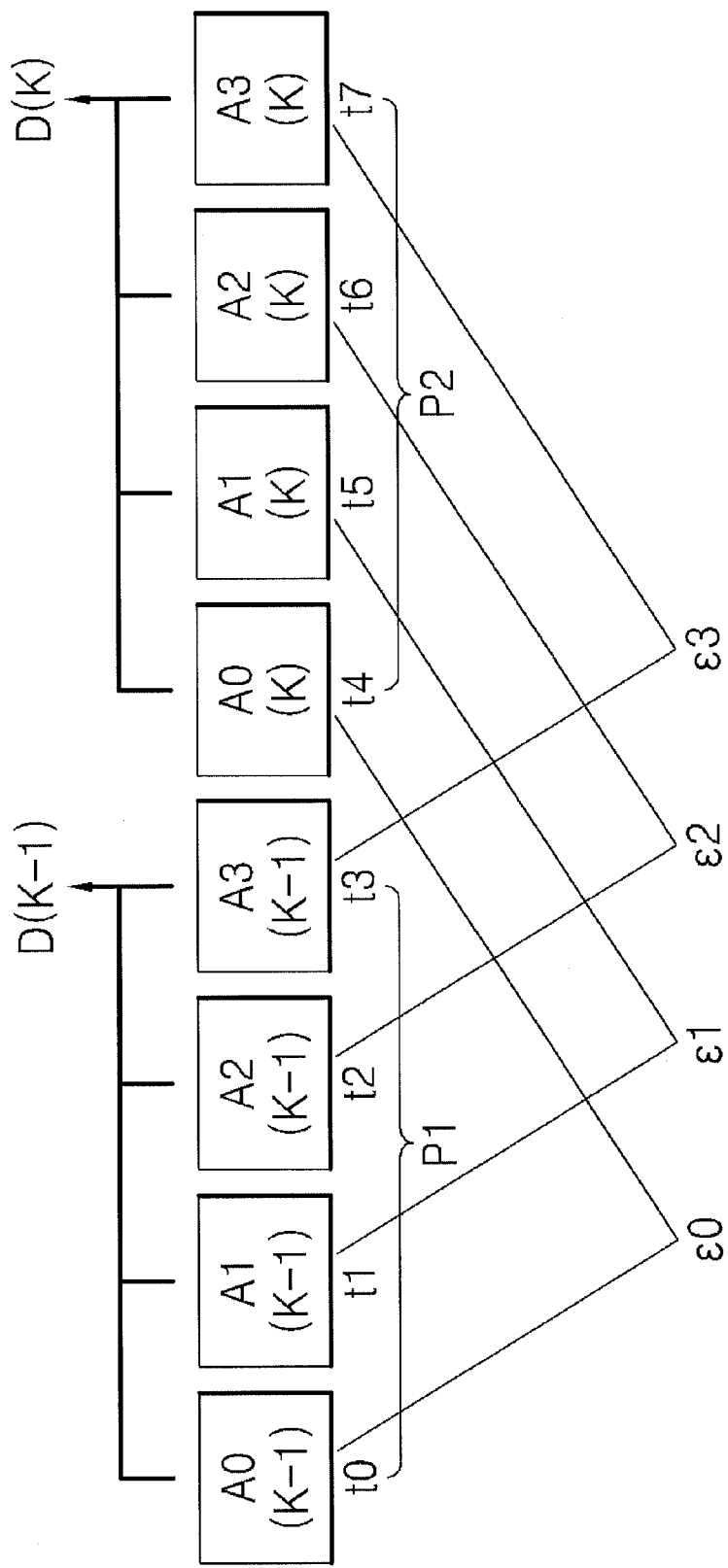
FIG. 6A is an example of a diagram for explaining a method of calculating depth information by using a plurality of pixel signals detected successively using the one-tap depth pixel illustrated in FIG. 1.

FIG. 6A is an example diagram for explaining a method of calculating depth information by using a plurality of pixel signals detected successively using the one-tap depth pixel illustrated in FIG. 1. Referring to FIGS. 1 to 6A, the depth error compensator 39 calculates a phase difference θ by using the plurality of first digital pixel signals A0(K−1), A1(K−1), A2(K−1) and A3(K−1). The phase difference θ is as shown in equation 9.

$$\theta = \tan^{-1}\frac{A1(K-1) - A3(K-1)}{A0(K-1) - A2(K-1)}.$$ [Equation 9]

The depth error compensator 39 calculates depth information D(K−1) in the first time interval P1 based on the phase difference θ.

The depth error compensator 39 compares each of the plurality of first digital pixel signals A0(K−1), A1(K−1), A2(K−1) and A3(K−1) with each of the plurality of second digital pixel signals A0(K), A1(K), A2(K) and A3(K) to calculate depth information D(K) in the second time interval P2.

The depth error compensator 39 determines if each of the plurality of comparative values ϵ0, ϵ1, ϵ2 and ϵ3 is greater than the threshold value ϵth. When the target object 40 does not move in the second time interval P2, the depth error compensator 39 determines that each of the plurality of comparative values ϵ0, ϵ1, ϵ2 and ϵ3 is smaller than the threshold value ϵth.

When the depth error compensator 39 determines that each of the plurality of comparative values ϵ0, ϵ1, ϵ2 and ϵ3 is smaller than the threshold value ϵth, the depth error compensator 39 calculates a phase difference θ by using the plurality of second digital pixel signals A0(K), A1(K), A2(K) and A3(K). The phase difference θ is as shown in equation 10.

$$\theta = \tan^{-1}\frac{A1(K) - A3(K)}{A0(K) - A2(K)}$$ [Equation 10]

The depth error compensator 39 calculates depth information D(K) in the second time interval P2 based on the phase difference θ.

According to an example embodiment, an estimation algorithm may be used to compensate for a phase difference error occurring due to time difference of different detection time points t0 to t3 in a first time interval P1. Likewise, an estimation algorithm may be used to compensate for a phase difference error occurring due to time difference of different detection time points t4 to t7 in a second time interval P2.

FIG. 6B is another example of a diagram for explaining the method of calculating depth information by using a plurality of pixel signals detected successively using the one-tap depth pixel illustrated in FIG. 1. FIG. 6B depicts a plurality of digital pixel signals detected successively by using the one-tap depth pixel 23 when the target object 40 moves from an eighth time point t7. A diagonal lined eighth digital pixel signal A3(K) is a pixel signal detected when the target object 40 moves quickly or moves laterally from the eighth time point t7.

Referring to FIGS. 1 to 5 and 6B, the depth error compensator 39 calculates a phase difference θ according to the equation 9 by using the plurality of first digital pixel signals A0(K−1), A1(K−1), A2(K−1) and A3(K−1) and calculates depth information D(K−1) in a first time interval P1 based on the phase difference θ.

The depth error compensator 39 compares each of the plurality of first digital pixel signals A0(K−1), A1(K−1), A2(K−1) and A3(K−1) with each of the plurality of second digital pixel signals A0(K), A1(K), A2(K) and A3(K) to calculate depth information D(K) in a second time interval P2.

The depth error compensator 39 determines if each of a plurality of comparative values ϵ0, ϵ1, ϵ2 and ϵ3 is greater than a threshold value ϵth. When the target object 40 moves quickly or moves laterally at the eighth time point t7, the depth error compensator 39 determines that a fourth comparative value ϵ3 is greater than the threshold value ϵth and a third comparative value ϵ2 is smaller than the threshold value ϵth.

When the depth error compensator 39 determines the fourth comparative value ϵ3 is greater than the threshold value ϵth and the third comparative value ϵ2 is smaller than the threshold value ϵth, and calculates depth information D(K) in a second time interval by using a plurality of second digital pixel signals A0(K), A1(K), A2(K) and A3(K) detected in a second time interval P2, the depth information D(K) in the second time interval may have an error due to an eighth digital pixel signal A3(K) detected at an eighth time point t7.

Accordingly, the depth error compensator 39, when determining a third comparative value ϵ2 is smaller than the threshold value ϵth, calculates a phase difference θ by using a fourth digital pixel signals A3(K−1) which is one of the plurality of first digital pixel signals and some A0(K), A1(K) and A2(K) of a plurality of second digital signals. The phase difference θ is as shown in equation 11.

$$\theta = \tan^{-1}\frac{A1(K) - A3(K-1)}{A0(K) - A2(K)}$$ [Equation 11]

The depth error compensator 39 calculates depth information D(K) in a second time interval P2 based on the phase difference θ.

According to another example embodiment, the depth error compensator 39, when determining a fourth comparative value ϵ3 is greater than the threshold value ϵth and a third comparative value ϵ2 is smaller than the threshold value ϵth, may calculate a phase difference θ by using only some A0(K), A1(K) and A2(K) of the plurality of second digital pixel signals. The phase difference θ is as shown in equation 12.

$$\theta = \tan^{-1}\frac{2A1(K) - A0(K) - A2(K)}{A0(K) - A2(K)}$$ [Equation 12]

The depth error compensator 39 may calculate depth information D(K) in a second time interval P2 based on the phase difference θ.

Accordingly, when the depth error compensator 39 determines that a fourth comparative value ϵ3 is greater than the threshold value ϵth and a third comparative value ϵ2 is smaller than the threshold value ϵth, the depth error compensator 39 may compensate a depth information error D(K) in the second time interval P2 by calculating depth information D(K) in the second time interval P2 using the fourth digital pixel signal A3(K−1) and some A0(K), A1(K), A2(K) of the plurality of second digital pixel signals or by calculating depth information D(K) in the second time interval P2 by using only some A0(K), A1(K) and A2(K) of the plurality of second digital pixel signals.

FIG. 6C is still another example of a diagram for explaining the method of calculating depth information by using a plurality of pixel signals detected successively using the one-tap depth pixel illustrated in FIG. 1. FIG. 6C indicates digital pixel signals detected successively using the one-tap depth pixel when the target object 40 moves quickly or moves laterally from a seventh time point t6. A diagonal lined seventh digital pixel signal A2(K) and a diagonal lined eighth digital pixel signal A3(K) are pixel signals detected when the target object 40 moves quickly or moves laterally from the seventh time point t6.

FIGS. 1 to 5 and 6C, the depth error compensator 39 calculates a phase difference θ according to the equation 9 by using the plurality of first digital pixel signals A0(K−1), A1(K−1), A2(K−1) and A3(K−1) and calculates depth information D(K−1) in a first time interval P1 based on the phase difference θ.

The depth error compensator 39 determines if each of a plurality of comparative values ϵ0, ϵ1, ϵ2 and ϵ3 is greater than a threshold value ϵth according to the comparison results to calculate depth information D(K) in a second time interval P2. When the target object 40 moves quickly or moves laterally from a seventh time point t6, the depth error compensator 39 determines that a fourth comparative value ϵ3 and a third comparative value ϵ2 are greater than the threshold value ϵth and a second comparative value ϵ1 is smaller than the threshold value ϵth.

When the depth error compensator 39 determines that the fourth comparative value ϵ3 and the third comparative value ϵ2 are greater than the threshold value ϵth and the second comparative value ϵ1 is smaller than the threshold value ϵth, the depth error compensator 39 calculates a phase difference θ by using a third digital pixel signal A2(K−1) and a fourth digital pixel signal A3(K−1) among the plurality of first digital pixel signals and a fifth digital pixel signal A0(K) and a sixth digital pixel signal A1(K) among a plurality of second digital pixel signals. The phase difference θ is as shown in equation 13.

$$\theta = \tan^{-1} \frac{A1(K) - A3(K-1)}{A0(K) - A2(K-1)} \quad \text{[Equation 13]}$$

The depth error compensator 39 calculates depth information D(K) in a second time interval P2 based on the phase difference θ.

FIG. 6D is still another example diagram for explaining the method of calculating depth information by using a plurality of pixel signals detected successively using the one-tap depth pixel illustrated in FIG. 1. FIG. 6D depicts digital pixel signals detected successively using the one-tap depth pixel 23 when the target object 40 moves quickly or moves laterally from a sixth time point t5. A diagonal lined sixth digital pixel signal A1(K) to a diagonal lined eighth digital pixel signal A3(K) are pixel signals detected when the target object 40 moves quickly or moves laterally from the sixth time point t5.

FIGS. 1 to 5 and 6D, the depth error compensator 39 calculates a phase difference θ according to the equation 9 by using the plurality of first digital pixel signals A0(K−1), A1(K−1), A2(K−1) and A3(K−1) and calculates depth information D(K−1) in a first time interval P1 based on the phase difference θ.

The depth error compensator 39 compares each of the plurality of first digital pixel signals A0(K−1), A1(K−1), A2(K−1) and A3(K−1) with each of the plurality of second digital pixel signals A0(K), A1(K), A2(K) and A3(K) to calculate depth information D(K) in a second time interval P2.

The depth error compensator 39 determines if each of a plurality of comparative values ϵ0, ϵ1, ϵ2 and ϵ3 is greater than a threshold value ϵth according to the comparison results. When the target object 40 moves quickly or moves laterally from the sixth time point t5, the depth error compensator 39 determines that a fourth comparative value ϵ3, a third comparative value ϵ2 and a second comparative value ϵ1 are greater than the threshold value ϵth and a first comparative value ϵ0 is smaller than the threshold value ϵth.

When the depth error compensator 39 determines that the fourth comparative value ϵ3, the third comparative value ϵ2 and the second comparative value ϵ1 are greater than the threshold value ϵth and the first comparative value ϵ0 is smaller than the threshold value ϵth, the depth error compensator 39 calculates a phase difference θ by using a sixth digital pixel signal A1(K), a seventh digital pixel signal A2(K) and an eighth digital pixel signal A3(K) among the plurality of second digital pixel signals. The phase difference θ is as shown in equation 14.

$$\theta = \tan^{-1} \frac{A1(K) - A3(K)}{-2A2(K) + A1(K) + A3(K)} \quad \text{[Equation 14]}$$

The depth error compensator 39 calculates depth information D(K) in a second time interval P2 based on the phase difference θ.

Figure 6E:
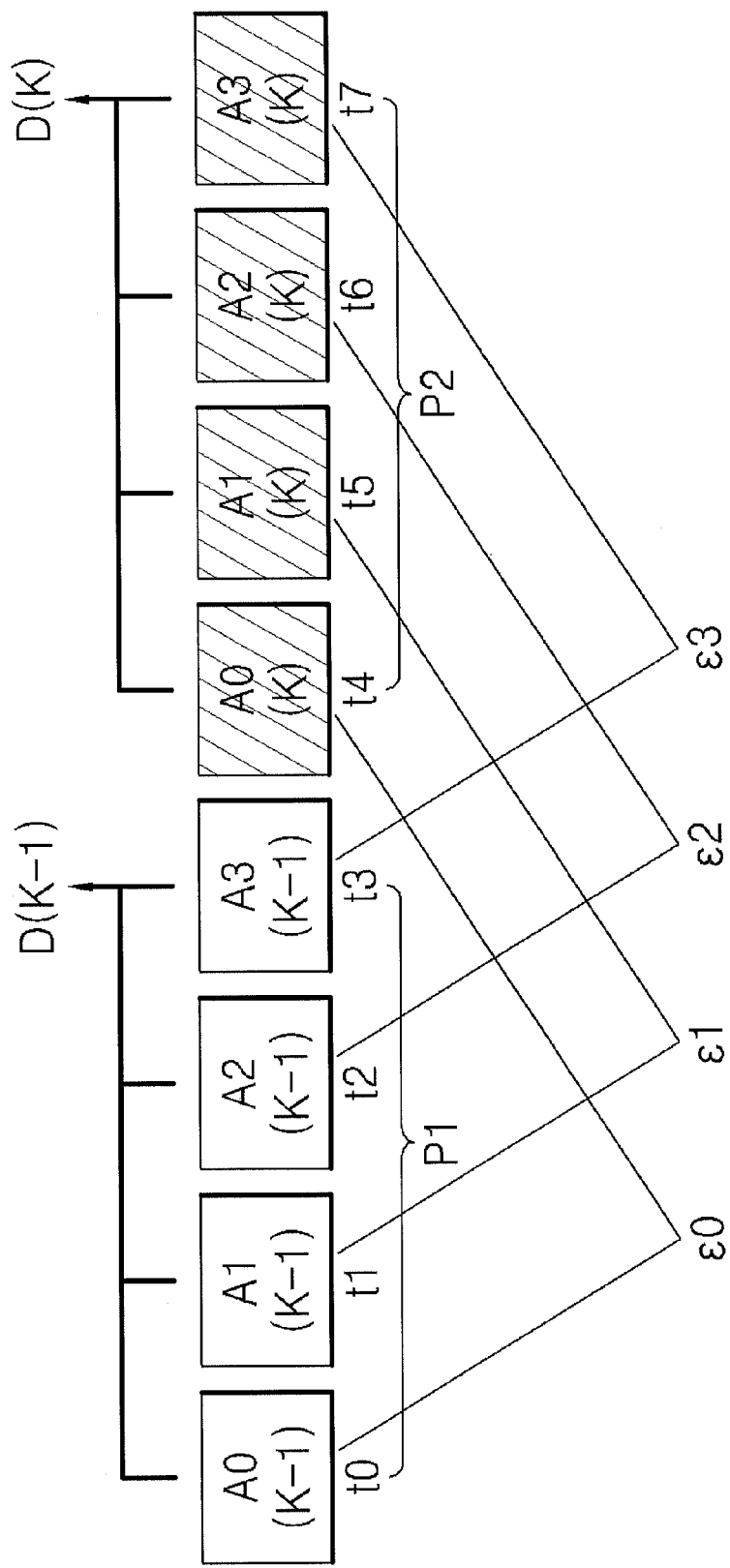
FIG. 6E is still another example of a diagram for explaining the method of calculating depth information by using the plurality of pixel signals detected successively using the one-tap depth pixel illustrated in FIG. 1.

FIG. 6E is still another example of a diagram for explaining the method of calculating depth information by using a plurality of pixel signals detected successively using the one-tap depth pixel illustrated in FIG. 1. FIG. 6E depicts digital pixel signals detected successively using the one-tap depth pixel when the target object 40 moves quickly or moves laterally from a fifth time point t4. A diagonal lined fifth digital pixel signal A0(K) to a diagonal lined eighth digital pixel signal A3(K) are a plurality of pixel signals detected when the target object 40 moves quickly or moves laterally from the fifth time point t4.

FIGS. 1 to 5 and 6E, the depth error compensator 39 calculates a phase difference θ according to the equation 9 by using the plurality of first digital pixel signals A0(K−1), A1(K−1), A2(K−1) and A3(K−1) and calculates depth information D(K−1) in a first time interval P1 based on the phase difference θ.

The depth error compensator 39 compares each of the plurality of first digital pixel signals A0(K−1), A1(K−1), A2(K−1) and A3(K−1) with each of the plurality of second digital pixel signals A0(K), A1(K), A2(K) and A3(K) to calculate depth information D(K) in a second time interval P2.

The depth error compensator 39 determines if each of a plurality of comparative values ϵ0, ϵ1, ϵ2 and ϵ3 is greater than a threshold value ϵth according to the comparison results. When the target object 40 moves quickly or moves laterally from the fifth time point t4, the depth error compensator 39 determines that each of the plurality of comparative values ϵ0, ϵ1, ϵ2 and ϵ3 is greater than the threshold value ϵth.

When the depth error compensator 39 determines that each of the plurality of comparative values ϵ0, ϵ1, ϵ2 and ϵ3 is greater than the threshold value ϵth, the depth error compensator 39 calculates a phase difference θ by using the plurality of second digital pixel signals A0(K), A1(K), A2(K) and A3(K). The phase difference θ is as shown in equation 15.

$$\theta = \tan^{-1} \frac{A1(K) - A3(K)}{A0(K) - A2(K)} \quad \text{[Equation 15]}$$

The depth error compensator 39 calculates depth information D(K) in a second time interval P2 based on the phase difference θ.

Figure 7:
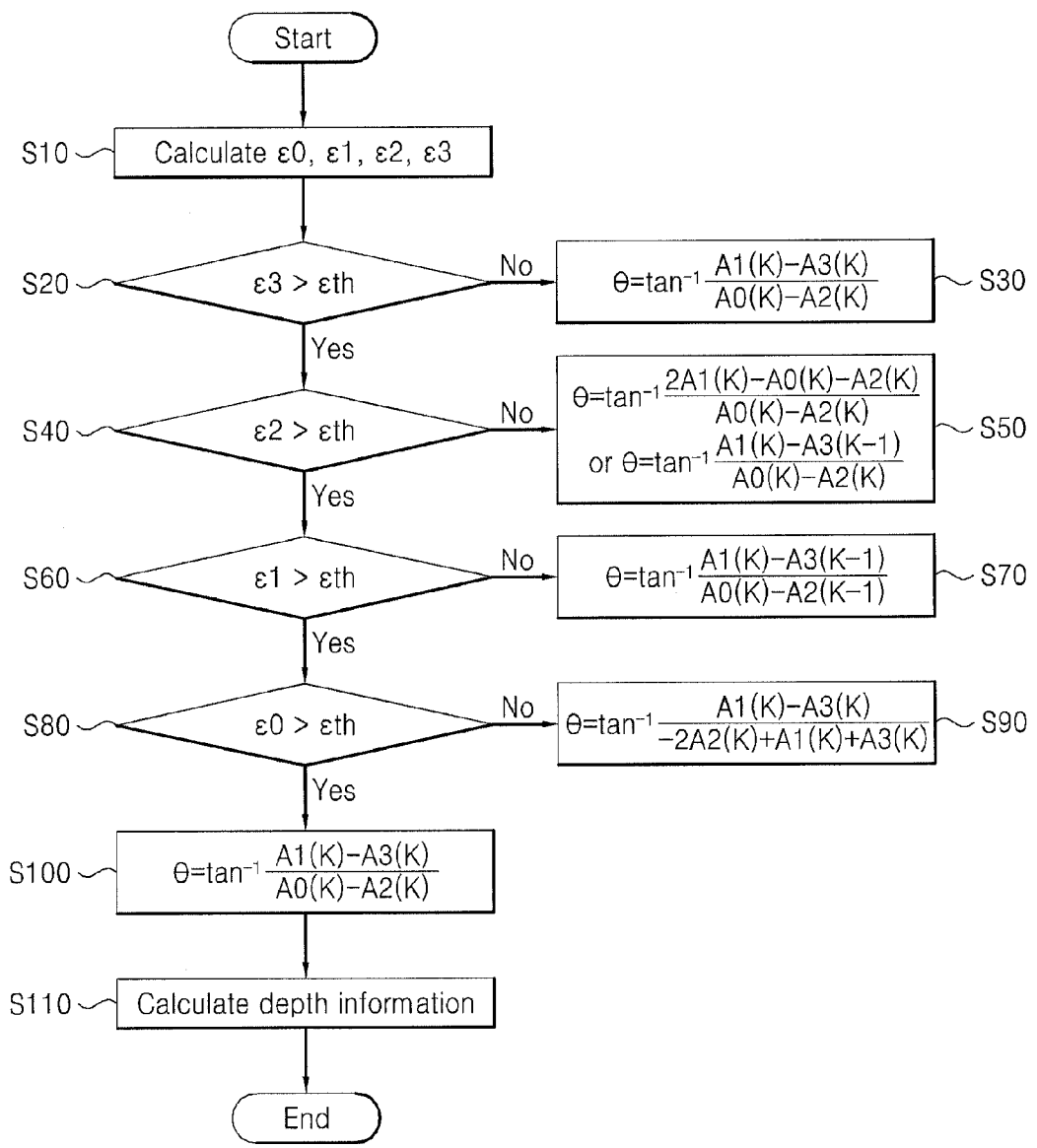
FIG. 7 is a flowchart for explaining a depth information error compensation method according to an example embodiment.

FIG. 7 is a flowchart for explaining a depth information error compensation method according to an example embodiment. Referring to FIGS. 1 to 7, the depth error compensator 39 compares each of the plurality of first digital pixel signals A0(K−1), A1(K−1), A2(K−1) and A3(K−1) with each of the plurality of second digital pixel signals A0(K), A1(K), A2(K) and A3(K) to calculate comparative values $\epsilon1, \epsilon2, \epsilon3$ and $\epsilon4$ in a second time interval P2(S10).

The depth error compensator 39 determines if a fourth comparative value $\epsilon3$ is greater than a threshold value $\epsilon$th according to the comparison results(S20).

When the depth error compensator 39 determines that the fourth comparative value $\epsilon3$ is smaller than the threshold value $\epsilon$th, the depth error compensator 39 calculates a phase difference θ according to the equation 10 explained in FIG. 6A by using the plurality of second digital pixel signals A0(K), A1(K), A2(K) and A3(K)(S30). When the depth error compensator 39 determines that the fourth comparative value $\epsilon3$ is greater than the threshold value $\epsilon$th and the third comparative value $\epsilon2$ is smaller than the threshold value $\epsilon$th(S40), the depth error compensator 39 calculates a phase difference according to the equation 11 explained in FIG. 6B by using a fourth digital pixel signal A3(K−1) which is one of the plurality of first digital pixel signals and some A0(K), A1(K) and A2(K) of the plurality of second digital pixel signals(S50).

According to another example embodiment, when the depth error compensator 39 determines that the fourth comparative value $\epsilon3$ is greater than the threshold value $\epsilon$th and the third comparative value $\epsilon2$ is smaller than the threshold value $\epsilon$th, the depth error compensator 39 may calculate a phase difference θ according to the equation 12 explained in FIG. 6B by using only some A0(K), A1(K) and A2(K) of the plurality of second digital pixel signals.

When the depth error compensator 39 determines that a fourth comparative value $\epsilon3$ and a third comparative value $\epsilon2$ are greater than the threshold value $\epsilon$th and a second comparative value $\epsilon1$ is smaller than the threshold value $\epsilon$th(S60), the depth error compensator 39 may calculate a phase difference θ according to the equation 13 explained in FIG. 6C by using a third digital pixel signal A2(K−1) and a fourth digital pixel signal A3(K−1) among the plurality of first digital pixel signals and a fifth digital pixel signal A0(K) and a sixth digital pixel signal A1(K) among the plurality of second digital pixel signals(S70).

When the depth error compensator 39 determines that the fourth comparative value $\epsilon3$, the third comparative value $\epsilon2$ and the second comparative value $\epsilon1$ are greater than the threshold value $\epsilon$th and the first comparative value $\epsilon0$ is smaller than the threshold value $\epsilon$th(S80), the depth error compensator 39 may calculate a phase difference θ according to the equation 14 explained in FIG. 6D by using a sixth digital pixel signal A1(K), a seventh digital pixel signal A2(K) and an eighth digital pixel signal A3(K) among the plurality of second digital pixel signals(S90).

When the depth error compensator 39 determines that each of the plurality of comparative values $\epsilon0, \epsilon1, \epsilon2$ and $\epsilon3$ is greater than the threshold value $\epsilon$th(S80), the depth error compensator 39 may calculate a phase difference θ according to the equation 15 explained in FIG. 6E by using a plurality of second digital pixel signals A0(K), A1(K), A2(K) and A3(K) (S100). The depth error compensator 39 calculates the phase difference according to the determination results and calculates the depth information by using the equation 2 (S110).

Figure 8:
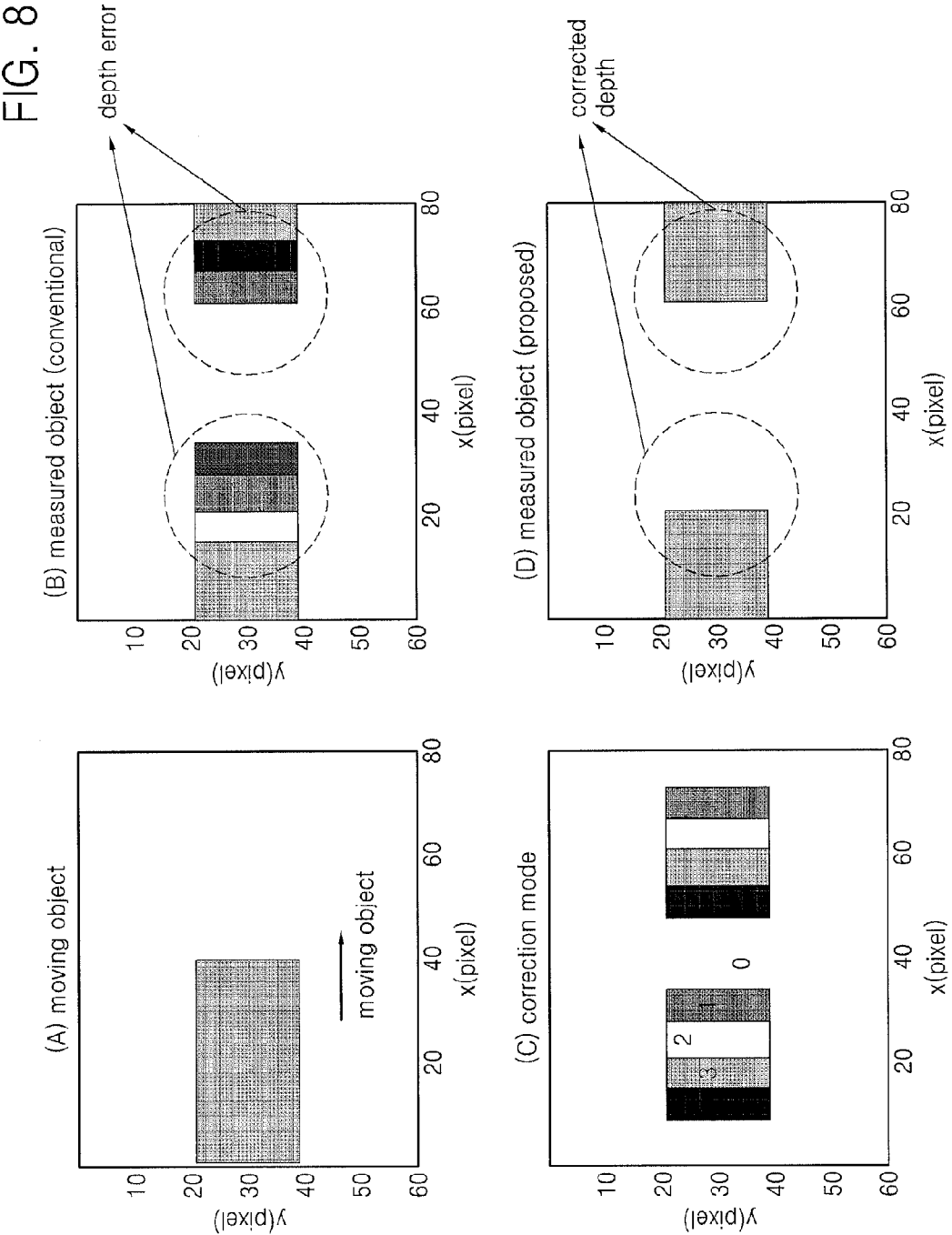
FIG. 8 is an example of a graph showing a simulation result including a depth information error of a depth sensor using a conventional estimation algorithm and depth information error compensation of the depth sensor illustrated in FIG. 1 according to an example embodiment.

FIGS. 8(A)-(C) is an example of a graph depicting a simulation result of a depth information error of a depth sensor using a conventional estimation algorithm and a depth information error compensation of the depth sensor illustrated in FIG. 1. FIG. 8 is a simulation graph depicting a depth information error when integration time Tint is 100 ms, speed of the target object 40 is 5 m/s, noise of amplitude is 30 LSB (5%) and noise of an offset is 40 LSB (5%).

Referring to FIGS. 1 to 8, (A) of FIG. 8 indicates the moving target object 40. As illustrated in (B) of FIG. 8, a depth information error occurs, i.e., when a conventional algorithm is used. Difference of brightness at (B) of FIG. 8 means a depth information error. (C) of FIG. 8 indicates a case when a depth information error occurs. '0' illustrated in (C) of FIG. 8 means a case of FIG. 6A, '1' illustrated in (C) of FIG. 8 means a case of FIG. 6B, '2' illustrated in (C) of FIG. 8 means a case of FIG. 6C, '3' illustrated (C) of FIG. 8 means a case of FIG. 6D, and '4' illustrated in (C) of FIG. 8 means a case of FIG. 6E.

When a depth information error compensation algorithm according to an example embodiment is used, it can be known that a depth information error is compensated as illustrated in (D) of FIG. 8.

Figure 9:
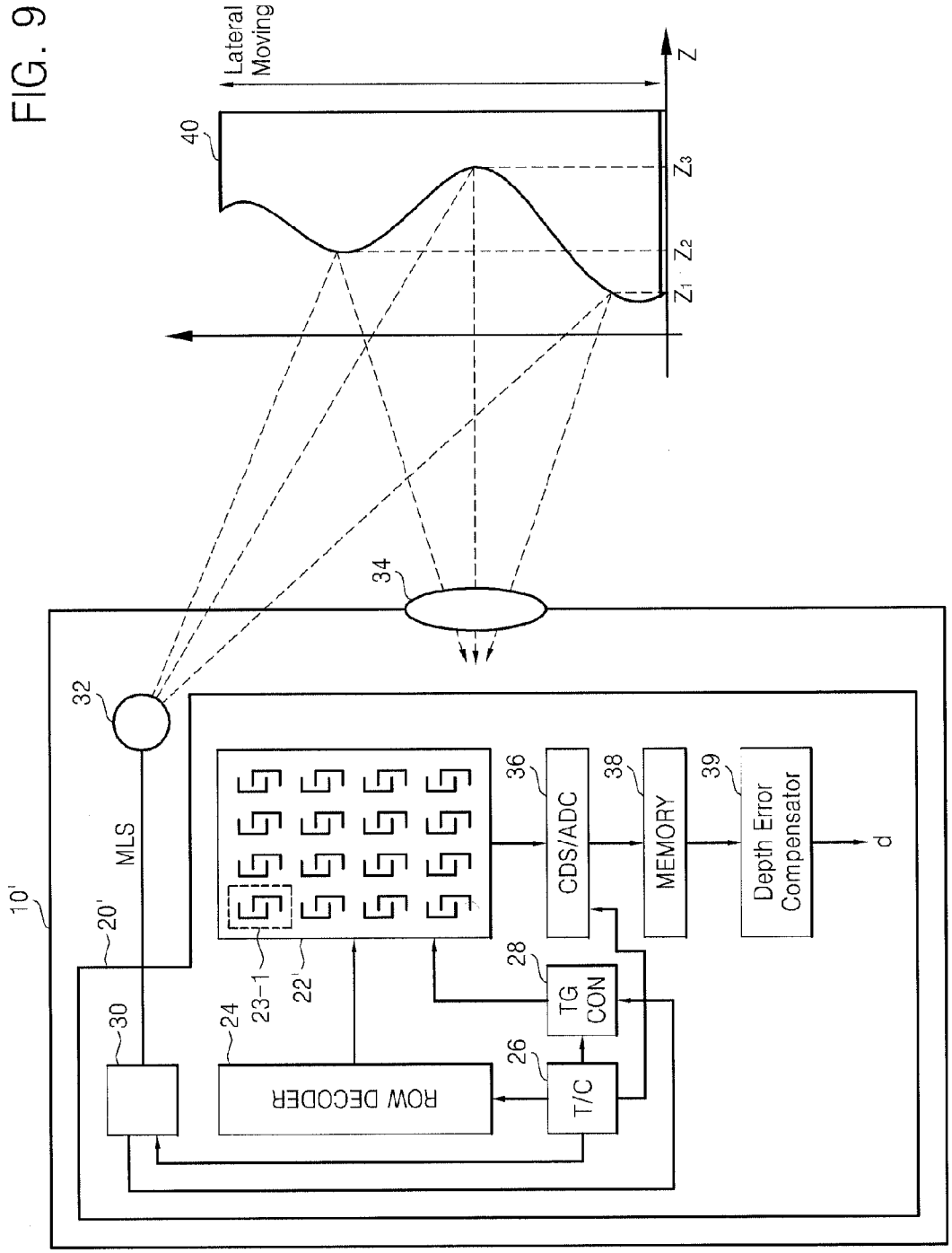
FIG. 9 is a block diagram of a depth sensor according to another example embodiment.
Figure 10:
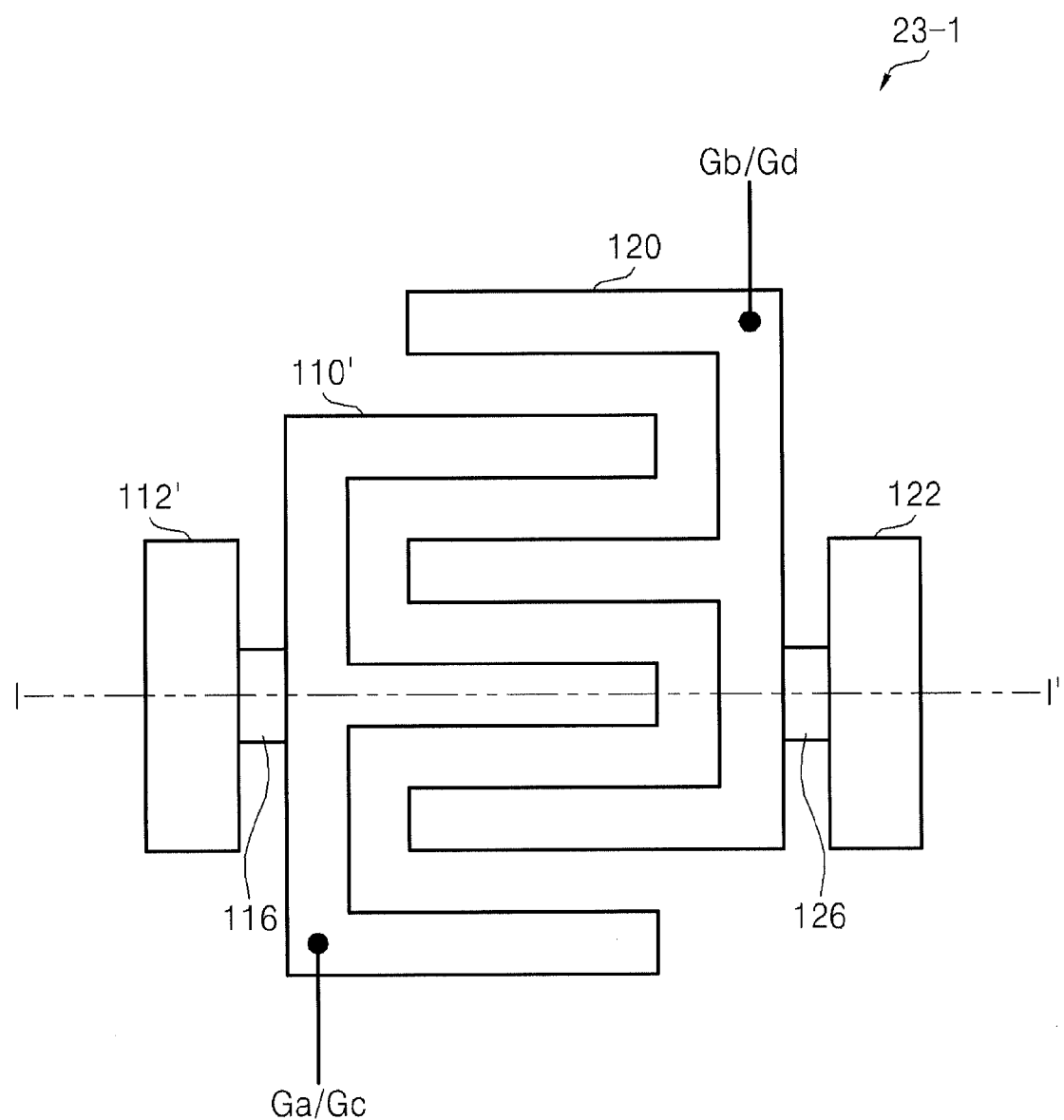
FIG. 10 is a plane diagram of a two-tap depth pixel illustrated in an array of FIG. 9.
Figure 11:
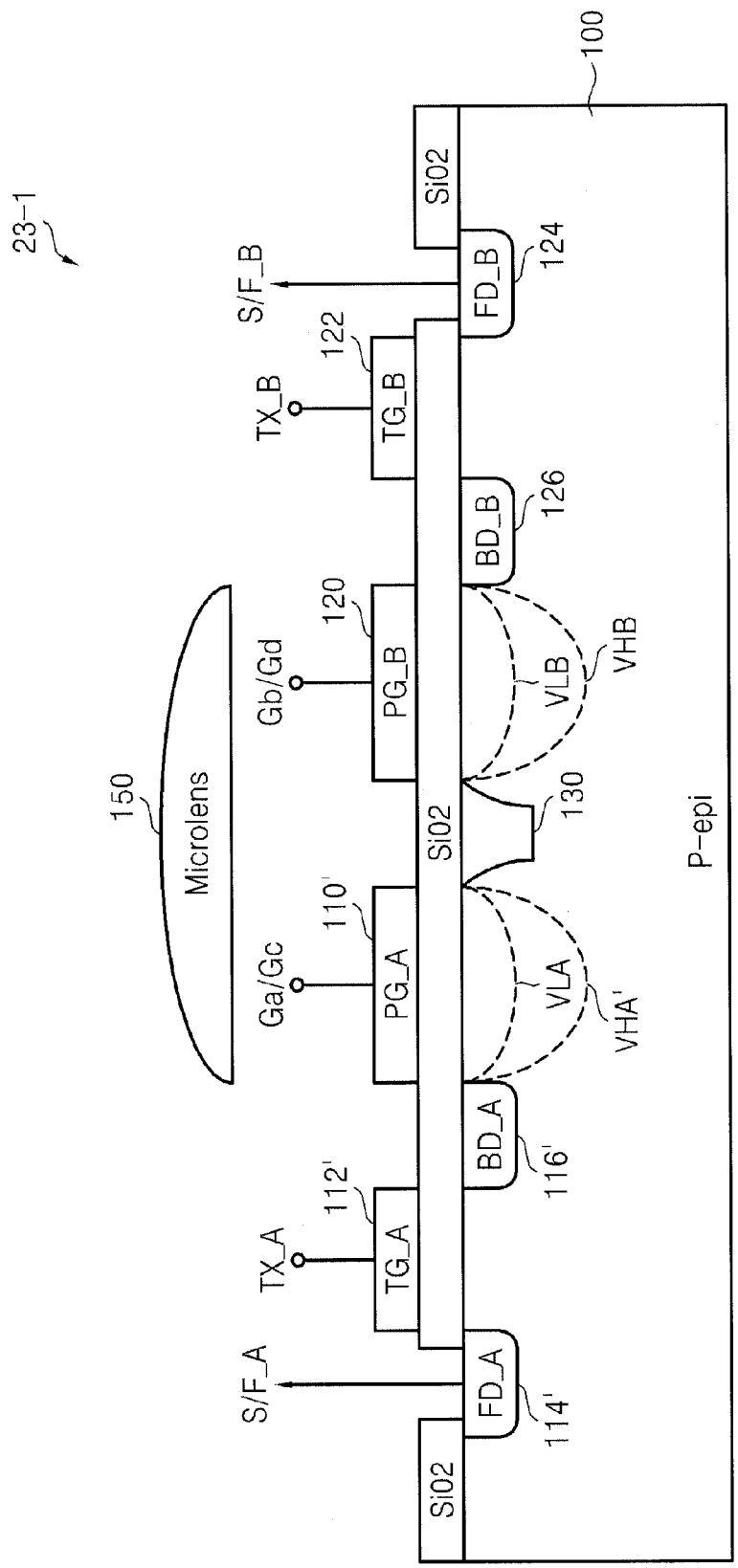
FIG. 11 is a cross-sectional diagram cutting a two-tap depth pixel of FIG. 9 by I-I'.
Figure 12:
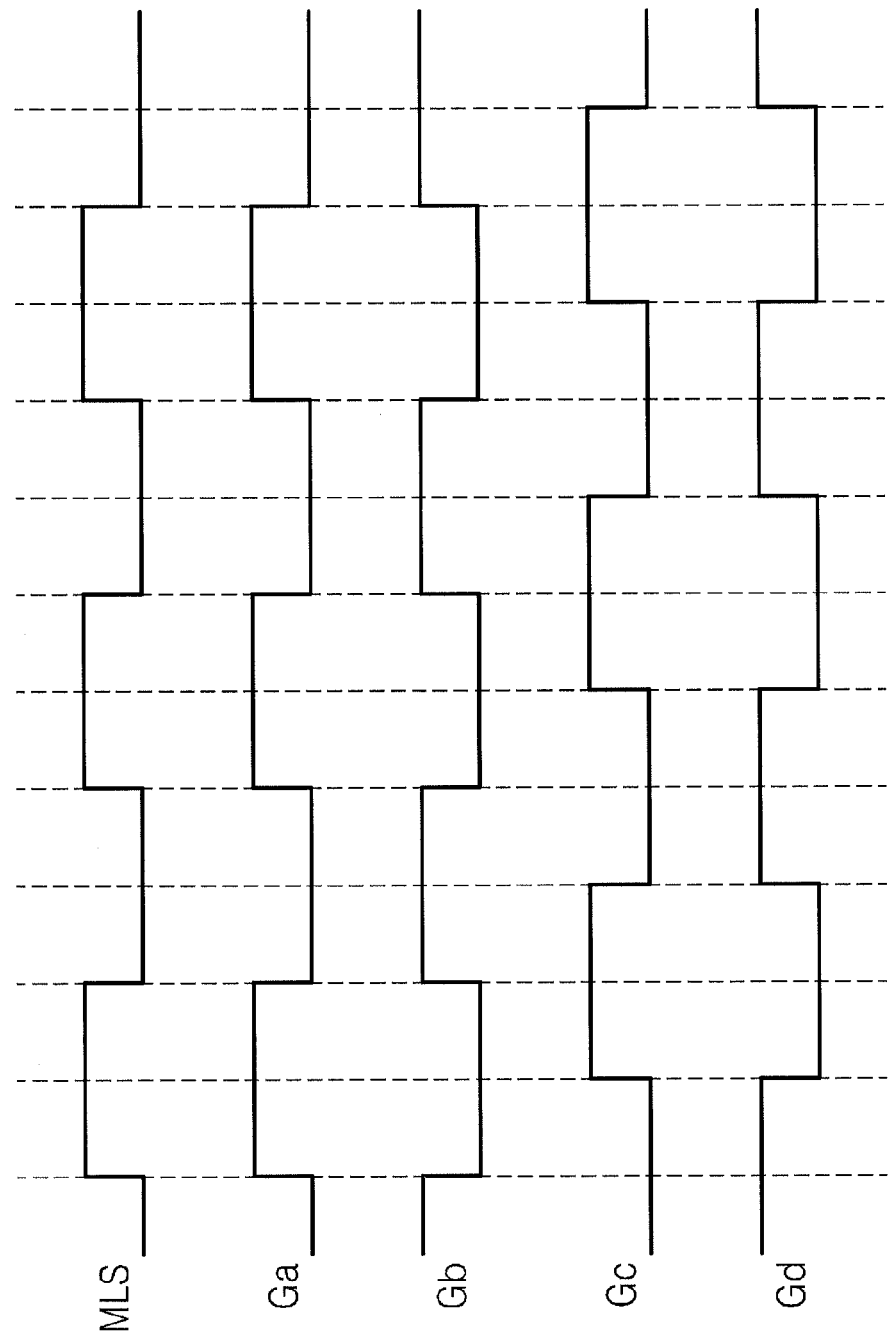
FIG. 12 is a timing diagram of a plurality of photo gate control signals for controlling a plurality of photo gates included in the two-tap depth pixel illustrated in FIG. 9.

FIG. 9 is a block diagram of a depth sensor according to another example embodiment, FIG. 10 is a plane diagram of the two-tap depth pixel illustrated in an array of FIG. 9, FIG. 11 is a cross sectional diagram cutting the two-tap depth pixel illustrated in FIG. 9 by I-I', FIG. 12 is a timing diagram of photo gate control signals for controlling a plurality of photo gates included in the two-tap depth pixel illustrated in FIG. 9, and FIG. 13 is a timing diagram for explaining a plurality of pixel signals detected successively using the two-tap depth pixel illustrated in FIG. 9.

Referring to FIGS. 9 to 13, a depth sensor 10' which may measure distance or depth by using time of flight(TOF) principle includes a semiconductor chip 20' including an array 22' where a plurality of two-tap depth pixels (detectors or sensors) 23-1 are arranged, a light source 32 and a lens module 34. Each of the plurality of two-tap depth pixels 23-1 embodied two dimensionally in the array 22 includes a first photo gate 110' and a second photo gate 120. Moreover, each of a plurality of two-tap depth pixels 23-1 includes a plurality of transistors for processing a signal.

A depth sensor 10' having the two-tap depth pixels 23-1 of FIG. 9 and a depth sensor 10 having the one-tap depth pixels 23 of FIG. 1 are different only in that they have the two-tap depth pixels 23-1 and the one-tap depth pixels 23, respectively, so that it should be regarded that components and signals of FIG. 9 perform the same function and operation as components and signals of FIG. 1 if there is no particular comment.

As illustrated in FIG. 13, a phase difference between the first photo gate control signal Ga and the third photo gate control signal Gc is 90°, a phase difference between the first photo gate control signal Ga and the second photo gate control signal Gb is 180°, and a phase difference between the first photo gate control signal Ga and the fourth photo gate control signal Gd is 270°.

During a first integration interval, the first photo gate control signal Ga is supplied to the first photo gate 110' and the second photo gate control signal Gb is supplied to the second photo gate 120. In addition, the third photo gate control signal Gc is supplied to the first photo gate 110' and the fourth photo gate control signals Gd is supplied to the second photo gate 120 during a second integration interval.

Referring to FIGS. 10 to 13, a first floating diffusion region 114' and a second floating diffusion region 124 are formed inside a P type substrate 100'.

The first floating diffusion region 114' may be connected to a gate of a first driving transistor S/F_A and the second floating diffusion region 124 may be connected to a gate of a second driving transistor S/F_B. Each driving transistor S/F_A or S/F_B may perform a function of a source follower. Each floating diffusion region 114' and 124 may be doped with N type impurities.

Silicon oxide is formed on the P type substrate 100, each photo gate 110' and 120 is formed on the silicon oxide and each transfer transistor 112' and 122 is formed. An isolation region 130 may be formed inside the P type substrate 100' to stop optical charges generated in the P type substrate 100' by each photo gate 110' and 120 from affecting each other. The P type substrate 100' may be an epitaxial substrate doped with $P^-$ and the isolation region 130 may be a region doped with $P^+$.

According to an example embodiment, the isolation region 130 may be embodied using a shallow trench isolation (STI) method or a local oxidation of silicon (LOCOS) method.

A first photo gate control signal Ga is supplied to the first photo gate 110' and a second photo gate control signal Gb is supplied to the second photo gate 120 during a first integration interval.

In addition, a first transmission control signal TX_A for transmitting optical charges, which are generated inside the P type substrate 100 located at the lower part of the first photo gate 110', to the first floating diffusion region 114' is supplied to a gate of the first transfer transistor 112'. A second transmission control signal TX_B for transmitting optical charges, which are generated inside the P type substrate 100' located at the lower part of the second photo gate 120, to the second floating diffusion region 124 is supplied to a gate of the second transfer transistor 122.

According to an example embodiment, a first bridging diffusion region 116' may further be formed inside the P type substrate 100' located between the lower part of the first photo gate 110' and the lower part of the first transfer transistor 112'. Moreover, a second bridging diffusion region 126 may further be formed inside the P type substrate 100' located between the lower part of the second photo gate 120 and the lower part of the second transfer transistor 122. Each bridging diffusion region 116' or 126 may be doped with N-type impurities. Optical charges are generated by optical signals incident to inside the P type substrate 100' through each photo gate 110' and 120.

When a first transmission control signal TX_A having a first level, e.g., 1.0V, is supplied to a gate of the first transfer transistor 112' and a first photo gate control signal Ga having a high level, e.g., 3.3V, is supplied to the first photo gate 110', charges generated inside the P type substrate 100' are collected at the lower part of the first photo gate 110', and collected charges are transmitted to the first floating diffusion region 114'(e.g., when a first bridging diffusion region 116' is not formed) or transmitted to the first floating diffusion region 114' through the first bridging diffusion region 116'(e.g., when the first bridging diffusion region 116 is formed).

At the same time, when a second transmission control signal TX_B having a first level, e.g., 1.0V, is supplied to a gate of the second transfer transistor 122 and a second photo gate control signal Gb having a low level, e.g., 0V, is supplied to the second photo gate 120, optical charges are generated inside the P type substrate 100' located at the lower part of the second photo gate 120 but generated optical charges are not transmitted to the second floating diffusion region 124. It is defined as a charge collection operation.

Here, VHA' indicates a region where potential or charges, when a first photo gate control signal Ga having a high level is supplied to the first photo gate 110', are accumulated, and VLB indicates a region where potential or charges, when a second photo gate control signal Gb having a low level is supplied to the second photo gate 120, are accumulated.

When a first transmission control signal TX_A having a first level, e.g., 1.0V, is supplied to a gate of the first transfer transistor 112' and a first photo gate control signal Ga having a low level, e.g., 0V, is supplied to the first photo gate 110', optical charges are generated inside the P type substrate 100' located at the lower part of the first photo gate 110' but generated optical charges are not transmitted to the first floating diffusion region 114'.

At the same time, when a second transmission control signal TX_B having a first level, e.g., 1.0V, is supplied to a gate of the second transfer transistor 122 and a second photo gate control signal Gb having a high level, e.g., 3.3V, is supplied to the second photo gate 120, charges are generated inside the P type substrate 100' are collected to the lower part of the second photo gate 120, and collected charges are transmitted to the second floating diffusion region 124 (e.g., when a second bridging diffusion region 126 is not formed) or transmitted to the second floating diffusion region 124 through the second bridging diffusion region 126 (e.g., when the second bridging diffusion region 126 is formed). It is defined as a charge transmission operation.

Here, VHB indicates a region where potential or charges, when a second photo gate control signal Gb having a high level is supplied to the second photo gate 120, are accumulated, and VLA indicates a region where potential or charges, when a first photo gate control signal Ga having a low level is supplied to the first photo gate 110', are accumulated.

A charge collection operation and a charge transmission operation when a third photo gate control signal Gc is supplied to the first photo gate 110 are similar to a charge collection operation and a charge transmission operation when a first photo gate control signal Ga is supplied to the first photo gate 110.

Moreover, a charge collection operation and a charge transmission operation when a fourth photo gate control signal Gd is supplied to the second photo gate 120 are similar to a charge collection operation and a charge transmission operation when a second photo gate control signal Gb is supplied to the second photo gate 120.

FIG. 13 is a timing diagram for explaining a plurality of pixel signals detected successively by using the two-tap depth pixel illustrated in FIG. 9. Referring to FIGS. 9 to 13, a two-tap depth pixel 23-1 detects or estimates a plurality of first pixel signals A0'(K−1), A1'(K−1), A2'(K−1) and A3'(K−1) at different detection time points t0 and t1 in a first time interval P1.

That is, the two-tap depth pixel 23-1 detects a first pixel signal A0'(K−1) and a third pixel signal A2'(K−1) respectively in response to each of a first photo gate control signal Ga having a phase difference of 0° and a second photo gate control signal Gb having a phase difference of 180° at a first time point t0.

The two-tap depth pixel 23-1 detects a second pixel signal A1'(K−1) and a fourth pixel signal A3'(K−1) respectively in response to each of a third photo gate control signal Gc having a phase difference of 90° and a fourth photo gate control signal Gd having a phase difference of 270° at a second time point t1. Likewise, the two-tap depth pixel 23-1 detects a plurality of second pixel signals A0'(K), A1'(K), A2'(K) and A3'(K) at different detection time points t2 and t3 in a second time interval P2. That is, the two-tap depth pixel 23-1 detects a fifth pixel signal A0'(K) and a seventh pixel signal A2'(K) respectively in response to each of a first photo gate control signal Ga having a phase difference of 0° and a second photo gate control signal Gb having a phase difference of 180° at a third time point t2.

The two-tap depth pixel 23-1 detects a sixth pixel signal A1'(K) and an eighth pixel signal A3'(K) respectively in response to each of a third photo gate control signal Gc having a phase difference of 90° and a fourth photo gate control signal Gd having a phase difference of 270° at a fourth time point t3.

Figure 14A:
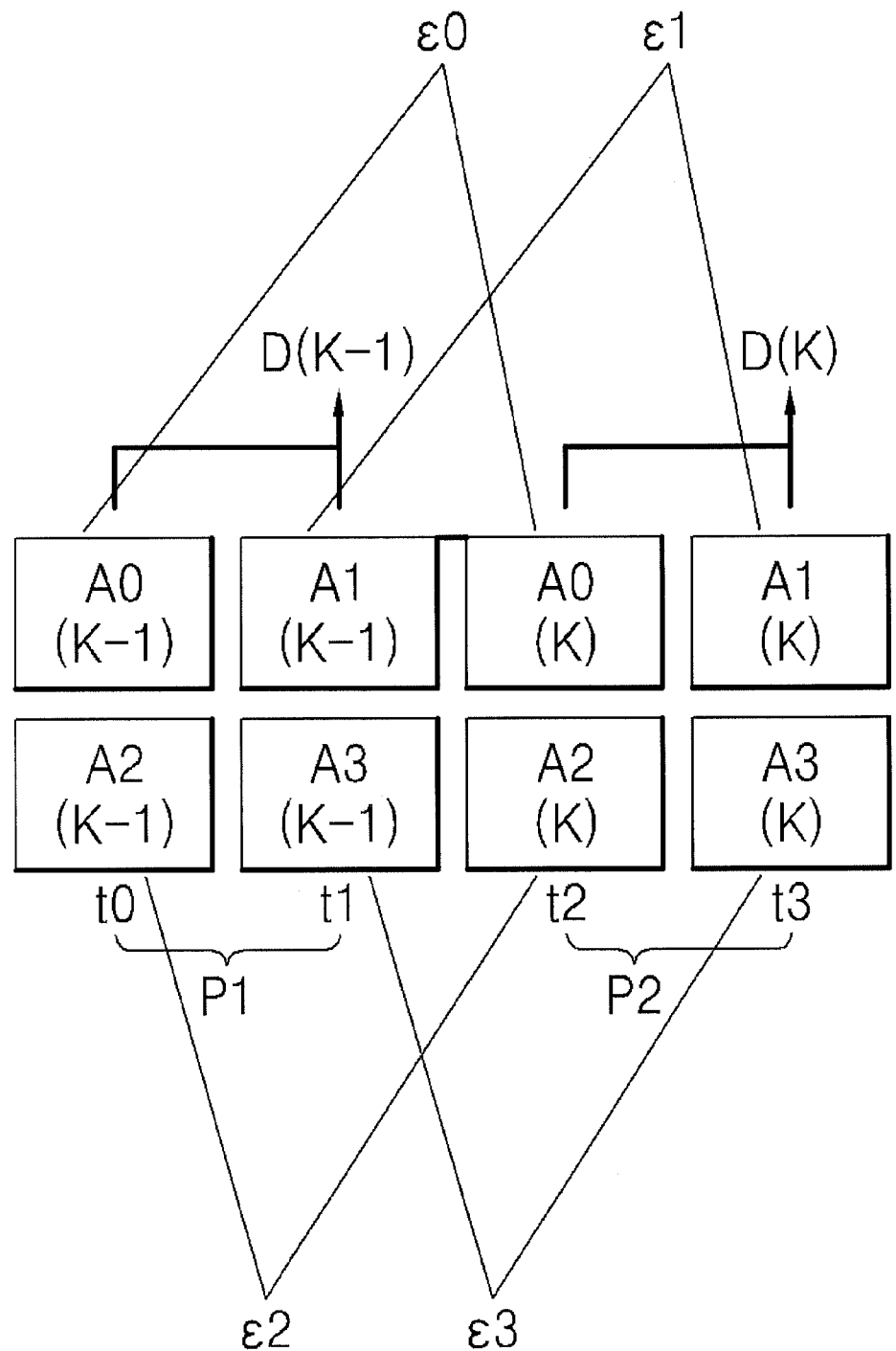
FIG. 14A is an example of a diagram for explaining a method of calculating depth information by using a plurality of pixel signals detected by using the two-tap depth pixel illustrated in FIG. 9.

FIG. 14A is an example diagram for explaining the method of calculating depth information by using a plurality of pixel signals detected by using the two-tap depth pixel illustrated in FIG. 9. Referring to FIG. 9, a digital circuit 36, i.e., a correlated double sampling(CDS)/analog to digital(ADC) circuit, performs a CDS operation and an ADC operation on each pixel signal A0'(K−1), A1'(K−1), A2'(K−1), A3'(K−1), A0' (K), A1'(K), A2'(K) and A3'(K) and outputs each digital pixel signal A0(K−1), A1(K−1), A2(K−1), A3(K−1), A0(K), A1(K), A2(K) and A3(K) under a control of the timing controller 26. The depth sensor 10' of FIG. 9 may further include active load circuits for transmitting pixel signals output from a plurality of column lines embodied in the array 22' to the CDS/ADC circuit 36. Referring to FIGS. 9 to 14A, the depth error compensator 39 calculates a phase difference according to the equation 9 by using a plurality of first digital pixel signals A0(K−1), A1(K−1), A2(K−1) and A3(K−1) and calculates depth information D(K−1) in a first time interval P1 based on the phase difference.

The depth error compensator 39 compares each of the plurality of first digital pixel signals A0(K−1), A1(K−1), A2(K−1) and A3(K−1) with each of the plurality of second digital pixel signals A0(K), A1(K), A2(K) and A3(K) to calculate depth information D(K) in a first time interval P1.

The depth error compensator 39 determines if each of a plurality of comparative values ϵ0, ϵ1, ϵ2 and ϵ3 is greater than a threshold value ϵth according to the comparison results. When the target object 40 has no change in a second time interval P2, the depth error compensator 39 determines that each of the plurality of comparative values ϵ0, ϵ1, ϵ2 and ϵ3 is smaller than the threshold value ϵth.

When the depth error compensator 39 determines that each of the plurality of comparative values ϵ0, ϵ1, ϵ2 and ϵ3 is smaller than the threshold value ϵth, the depth error compensator 39 calculates a phase difference θ by using the plurality of second digital pixel signals A0(K), A1(K), A2(K) and A3(K). The phase difference θ is as shown in equation 16.

$$\theta = \tan^{-1} \frac{A1(K) - A3(K)}{A0(K) - A2(K)} \quad \text{[Equation 16]}$$

The depth error compensator 39 calculates depth information D(K) in a second time interval P2 based on the phase difference θ.

According to an example embodiment, an estimation algorithm for compensating a phase difference error occurred by time difference between different detection time points t0 and t1 in a first time interval P1 may be used. Likewise, an estimation algorithm for compensating a phase difference error occurred by time difference between different detection time points t2 and t3 in a second time interval P2 may be used.

Figure 14B:
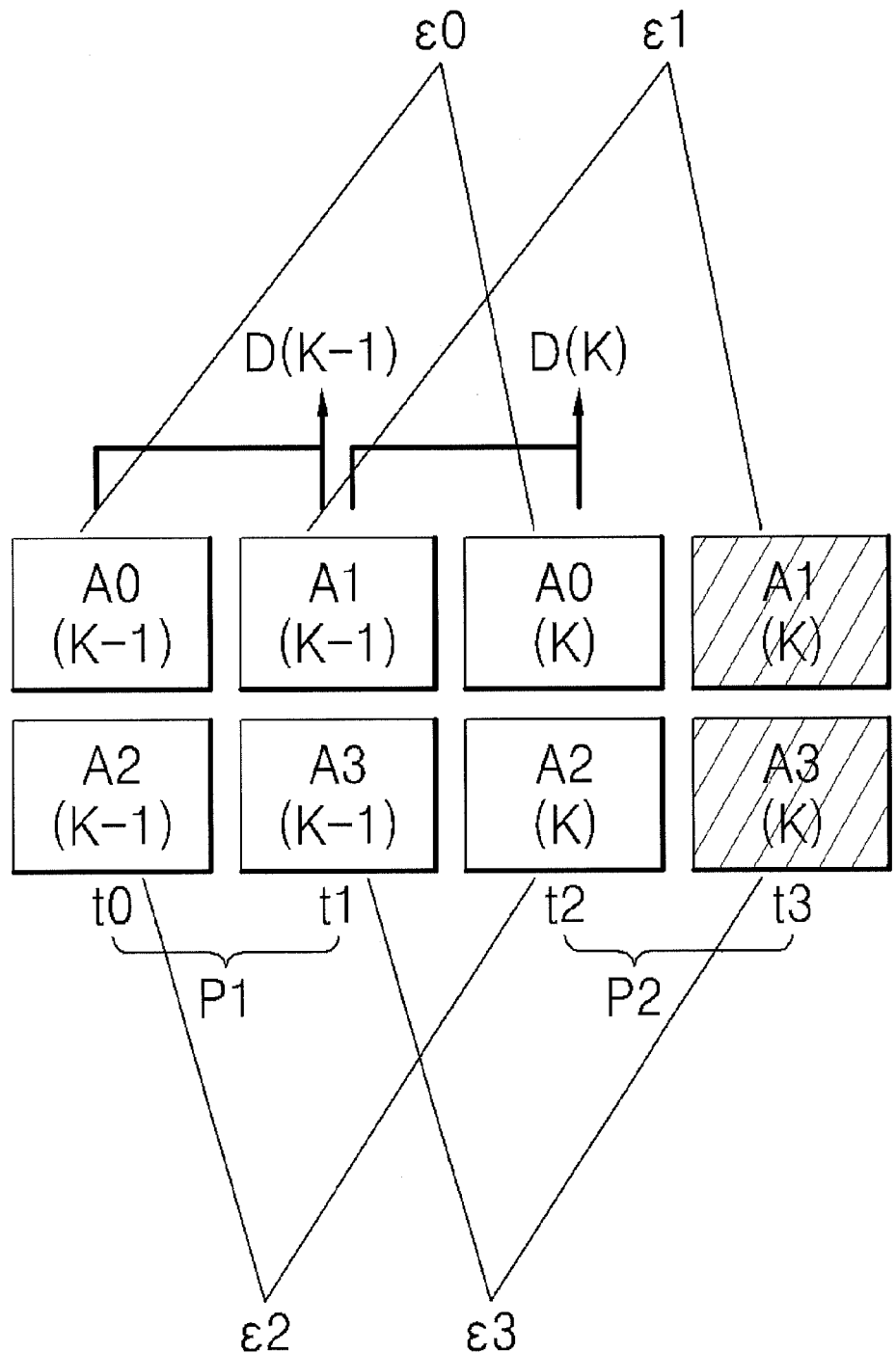
FIG. 14B is another example of a diagram for explaining the method of calculating depth information by using the plurality of pixel signals detected by using the two-tap depth pixel illustrated in FIG. 9.

FIG. 14B is another example diagram for explaining the method of calculating depth information by using a plurality of pixel signals detected by using the two-tap depth pixel illustrated in FIG. 9. FIG. 14B depicts digital pixel signals detected successively using the two-tap depth pixel when the target object 40 moves at a fourth time point t3. A diagonal lined seventh digital pixel signal A1(K) and a diagonal lined eighth digital pixel signal A3(K) are a plurality of pixel signals detected when the target object 40 moves quickly or moves laterally from the fourth time point t3.

FIGS. 9 to 13 and 14B, the depth error compensator 39 calculates a phase difference θ according to the equation 9 by using the plurality of first digital pixel signals A0(K−1), A1(K−1), A2(K−1) and A3(K−1) and calculates depth information D(K−1) in a first time interval P1 based on the phase difference θ.

The depth error compensator 39 compares each of the plurality of first digital pixel signals A0(K−1), A1(K−1), A2(K−1) and A3(K−1) with each of the plurality of second digital pixel signals A0(K), A1(K), A2(K) and A3(K) to calculate depth information D(K) in a second time interval P2.

The depth error compensator 39 determines if each of a plurality of comparative values ϵ0, ϵ1, ϵ2 and ϵ3 is greater than a threshold value ϵth according to the comparison results. When the target object 40 moves quickly or moves laterally at the fourth time point t3, the depth error compensator 39 determines that a second comparative value ϵ1 or a fourth comparative value ϵ3 among the plurality of comparative values ϵ0, ϵ1, ϵ2 and ϵ3 is greater than the threshold value ϵth, and that a first comparative value ϵ0 and a third comparative value ϵ2 are smaller than the threshold value ϵth.

When the depth error compensator 39 determines that the second comparative value ϵ1 or the fourth comparative value ϵ3 among the plurality of comparative values ϵ0, ϵ1, ϵ2 and ϵ3 is greater than the threshold value ϵth, and that the first comparative value ϵ0 and the third comparative value ϵ2 are smaller than the threshold value ϵth, an error may be occurred on depth information D(K) in the second time interval by a sixth digital pixel signal A1(K) and an eighth digital pixel signal A3(K) detected at a fourth time point t3 when the depth error compensator 39 calculates depth information D(K) in the second time interval by using the plurality of second digital pixel signals A0(K), A1(K), A2(K) and A3(K) detected in the second time interval P2.

Accordingly, when the depth error compensator 39 determines that a second comparative value ϵ1 or a fourth comparative value ϵ3 among the plurality of comparative values ϵ0, ϵ1, ϵ2 and ϵ3 is greater than the threshold value ϵth, and that a first comparative value ϵ0 and a third comparative value ϵ2 are smaller than the threshold value ϵth, the depth error compensator 39 calculates a phase difference by using a second digital pixel signal A1(K−1) and a fourth digital pixel signal A3(K−1) among the plurality of first digital pixel signals and a fifth digital pixel signal A0(K) and a seventh digital pixel signal A2(K) among the plurality of second digital pixel signals. The phase difference is as shown in equation 17.

$$\theta = \tan^{-1} \frac{A1(K-1) - A3(K-1)}{A0(K) - A2(K)} \quad \text{[Equation 17]}$$

The depth error compensator 39 calculates depth information D(K) in a second time interval P2 based on the phase difference θ.

Accordingly, when the depth error compensator 39 determines that a second comparative value ϵ1 or a fourth comparative value ϵ3 among the plurality of comparative values ϵ0, ϵ1, ϵ2 and ϵ3 is greater than the threshold value ϵth, and that a first comparative value ϵ0 and a third comparative value ϵ2 are smaller than the threshold value ϵth, the depth error compensator 39 may compensate an error of depth information D(K) in the second time interval by calculating the depth information D(K) in the second time interval using a second digital pixel signal A1(K−1) and a fourth digital pixel signal A3(K−1) among the plurality of first digital pixel signals and a fifth digital pixel signal A0(K) and a seventh digital pixel signal A2(K) among the plurality of second digital pixel signals.

Figure 14C:
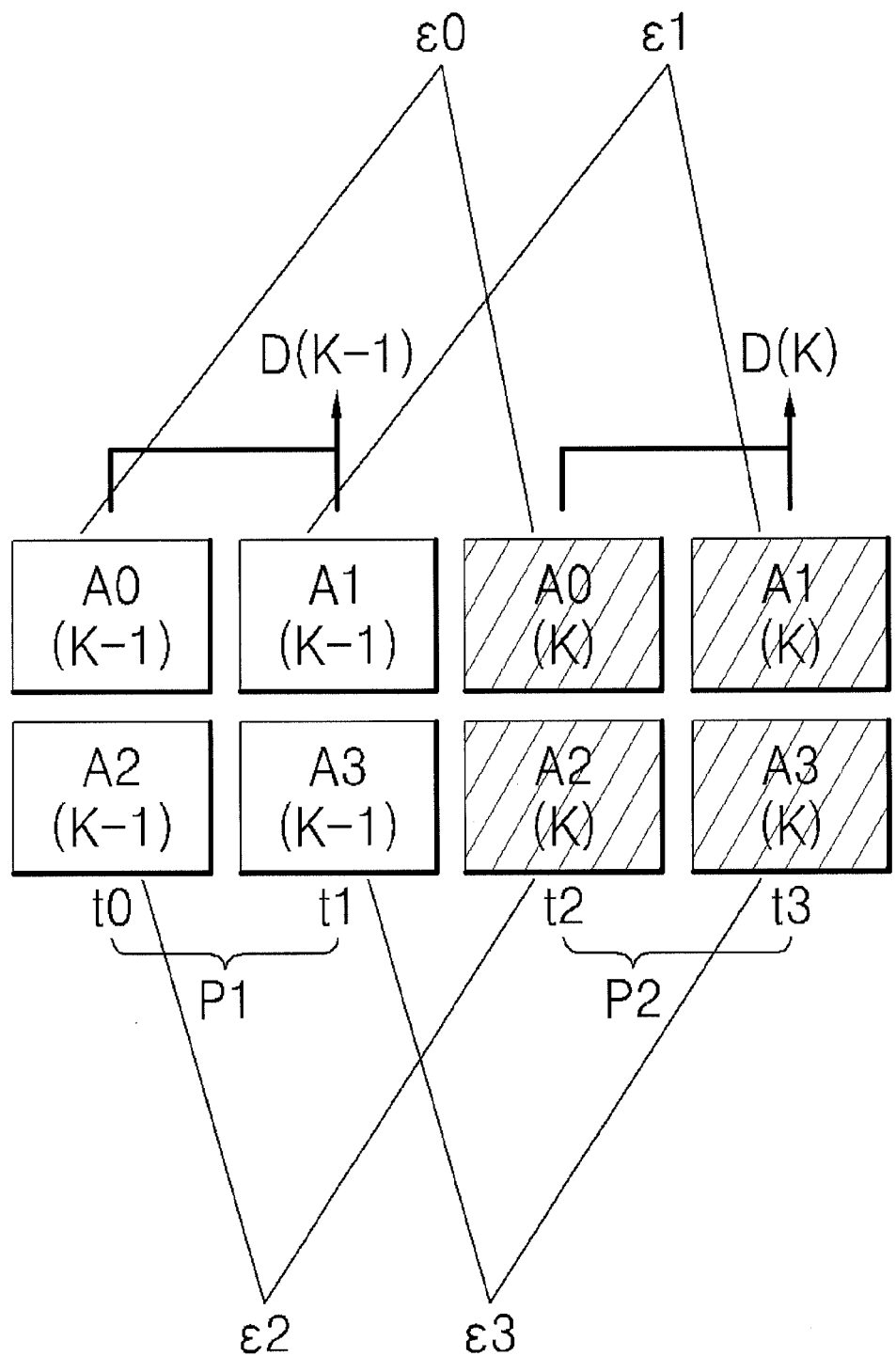
FIG. 14C is still another example of a diagram for explaining the method of calculating depth information by using the plurality of pixel signals detected by using the two-tap depth pixel illustrated in FIG. 9.

FIG. 14C is still another example diagram for explaining the method of calculating depth information by using a plurality of pixel signals detected by using the two-tap depth pixel illustrated in FIG. 9. FIG. 14C depicts digital pixel signals detected successively by using the two-tap depth pixel when the target object 40 moves at a third time point t2. A diagonal lined fifth digital pixel signal A0(K) to a diagonal lined eighth digital pixel signal A3(K) are a plurality of detected pixel signals when the target object 40 moves quickly or moves laterally at the third time point t2.

Referring to FIGS. 9 to 13 and 14C, the depth error compensator 39 calculates a phase difference θ according to the equation 9 by using the plurality of first digital pixel signals A0(K−1), A1(K−1), A2(K−1) and A3(K−1) and calculates depth information D(K−1) in a first time interval P1 based on the phase difference θ.

The depth error compensator 39 compares each of the plurality of first digital pixel signals A0(K−1), A1(K−1), A2(K−1) and A3(K−1) with each of the plurality of second digital pixel signals A0(K), A1(K), A2(K) and A3(K) to calculate depth information D(K) in a second time interval P2.

The depth error compensator 39 determines if each of a plurality of comparative values ϵ0, ϵ1, ϵ2 and ϵ3 is greater than a threshold value ϵth according to the comparison results. When the target object 40 moves quickly or moves laterally from a third time point t2, the depth error compensator 39 determines that a second comparative value ϵ1 or a fourth comparative value ϵ3 is greater than the threshold value ϵth, and that a first comparative value ϵ0 or a third comparative value ϵ2 is greater than the threshold value ϵth.

When the depth error compensator 39 determines that the second comparative value ϵ1 or the fourth comparative value ϵ3 is greater than the threshold value ϵth, and that the first comparative value ϵ0 or the third comparative value ϵ2 is greater than the threshold value ϵth, the depth error compensator 39 calculates a phase difference θ by using a plurality of second digital pixel signals A0(K), A1(K), A2(K) and A3(K). The phase difference θ is as shown in equation 18.

$$\theta = \tan^{-1} \frac{A1(K) - A3(K)}{A0(K) - A2(K)}$$ [Equation 18]

The depth error compensator 39 calculates depth information D(K) at a second time interval P2 based on the phase difference θ.

Figure 15:
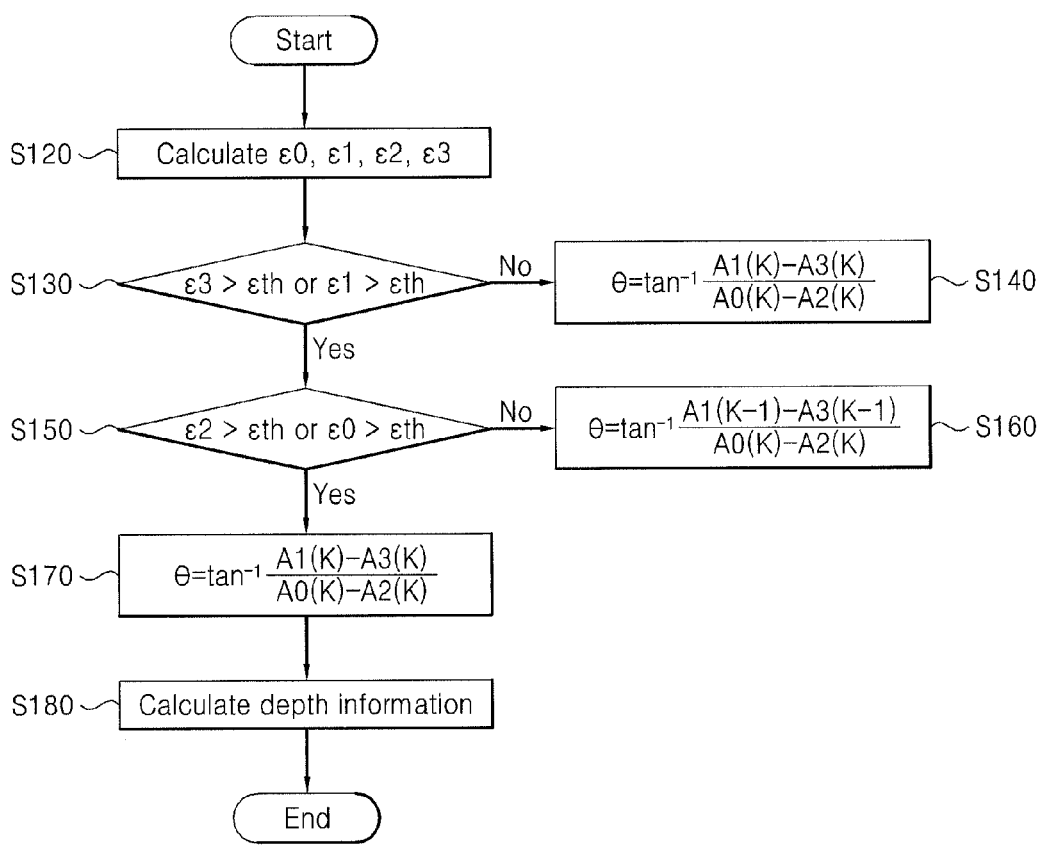
FIG. 15 is a flowchart for explaining a depth information error compensation method according to another example embodiment.

FIG. 15 is a flowchart for explaining a depth information error compensation method according to another example embodiment. Referring to FIGS. 9 to 15, the depth error compensator 39 compares each of the plurality of first digital pixel signals A0(K−1), A1(K−1), A2(K−1) and A3(K−1) with each of the plurality of second digital pixel signals A0(K), A1(K), A2(K) and A3(K) to calculate comparative values ϵ1, ϵ2, ϵ3 and ϵ4 in a second time interval P2(S120). The depth error compensator 39 determines if a second comparative value ϵ1 or a fourth comparative value ϵ3 is greater than a threshold value ϵth(S130).

When the depth error compensator 39 determines that the comparative values ϵ1 and ϵ3 are smaller than the threshold value ϵth(S130), the depth error compensator 39 calculates a phase difference according to the equation 16 explained in FIG. 14A by using the plurality of second digital pixel signals A0(K), A1(K), A2(K) and A3(K)(S140).

When the depth error compensator 39 determines that the second comparative value ϵ1 or the fourth comparative value ϵ3 is greater than the threshold value ϵth, and that the first comparative value ϵ0 and the third comparative value ϵ2 are smaller than the threshold value ϵth(S150), the depth error compensator 39 calculates a phase difference θ according to the equation 17 explained in FIG. 14B by using a second digital pixel signal A1(K−1) and a fourth digital pixel signal A3(K−1) among the plurality of first digital pixel signals and a fifth digital pixel signal A0(K) and a seventh digital pixel signal A2(K) among the plurality of second digital pixel signals(S160).

When the depth error compensator 39 determines that a second comparative value ϵ1 or a fourth comparative value ϵ3 among the plurality of comparative values ϵ0, ϵ1, ϵ2 and ϵ3 is greater than the threshold value ϵth, and that a first comparative value ϵ0 or a third comparative value ϵ2 is greater than the threshold value ϵth(S150), the depth error compensator 39 calculates a phase difference according to the equation 18 of FIG. 14C by using a plurality of second digital pixel signals A0(K), A1(K), A2(K) and A3(K)(S170).

The depth error compensator 39 calculates a phase difference according to the determination results and calculates the depth information by using the equation 2(S180).

FIG. 16A is an example of a unit pixel array of a three-dimensional image sensor. Referring to FIG. 16A, a unit pixel array 522-1 composing a part of a pixel array 522 of FIG. 17 may include a red pixel R, a green pixel G, a blue pixel B, and a depth pixel D. Configuration of the depth pixel D may be a depth pixel 23 having a one-tap pixel configuration as illustrated in FIG. 1 or the depth pixel 23-1 having the two-tap pixel configuration as illustrated in FIG. 9. The red pixel R, the green pixel G and the blue pixel B may be called RGB color pixels.

The red pixel R generates a red pixel signal corresponding to waves belonging to a red region among visible spectrum, the green pixel G generates a green pixel signal corresponding to waves belonging to a green region among the visible spectrum, and the blue pixel B generates a blue pixel signal corresponding to waves belonging to a blue region among the visible spectrum. The depth pixel D generates a depth pixel signal corresponding to waves belonging to an infrared region.

Figure 16B:
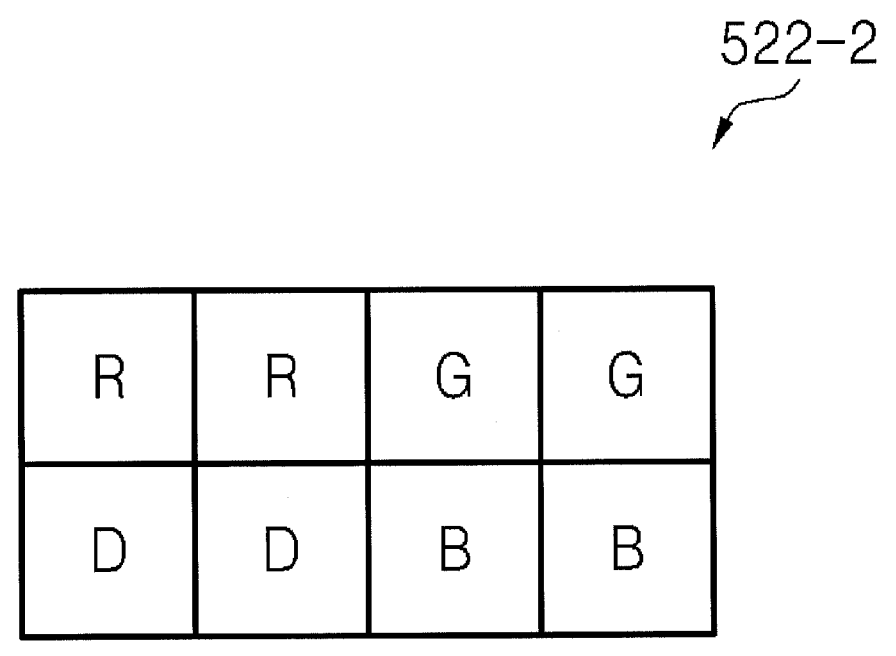

FIG. 16B is another example of the unit pixel array of the three-dimensional image sensor. Referring to FIG. 16B, a unit pixel array 522-2 composing a part of the pixel array 522 of FIG. 17 may include two red pixels R, two green pixels G, two blue pixels B and two depth pixels D.

The unit pixel array 522-1 and 522-2 illustrated in FIGS. 16A and 16B are examples described for convenience of explanation, and a pattern of the unit pixel array and pixels composing the pattern may change variously according to an example embodiment. For example, each pixel R, G and B illustrated in FIG. 16A may be replaced with a magenta pixel, a cyan pixel and a yellow pixel.

Figure 17:
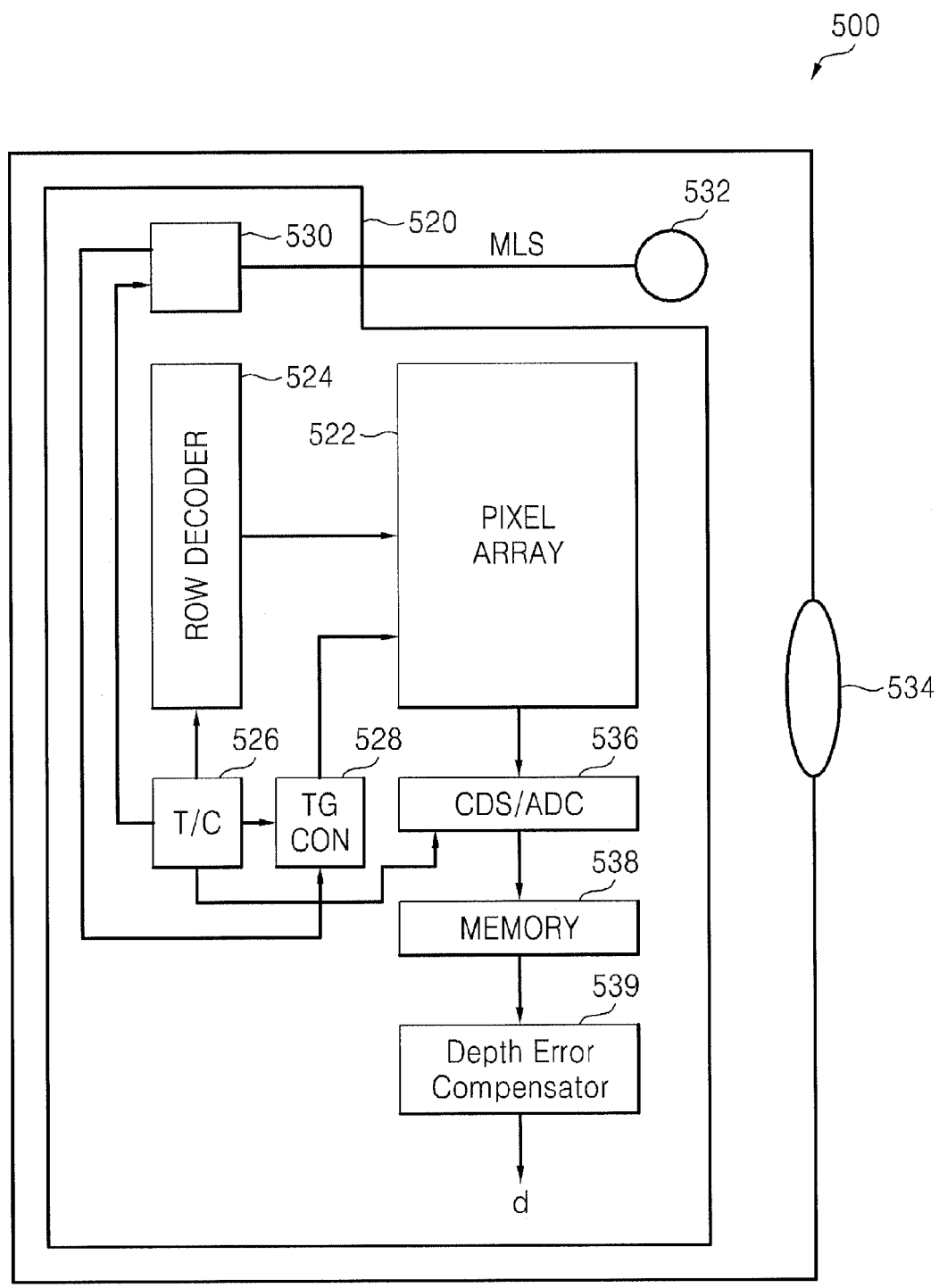
FIG. 17 is a block diagram of a three-dimensional image sensor according to an example embodiment.

FIG. 17 is a block diagram of a three-dimensional image sensor according to an example embodiment. Here, a three-dimensional image sensor means a device which may get three-dimensional image information by combining a function of measuring depth information by using a depth pixel D and a function of measuring each color information, e.g., red color information, green color information or blue color information, by using each color pixel R, G or B included in the unit pixel array 522-1 or 522-2 illustrated in FIG. 16A or 16B.

Referring to FIG. 17, a three-dimensional image sensor 500 includes a semiconductor chip 520, a light source 532 and a lens module 534. The semiconductor chip 520 includes the pixel array 522, a row decoder 524, a timing controller 526, a photo gate controller 528, a light source driver 530, a CDS/ADC circuit 536, a memory 538 and a depth error compensator 539.

Each of the row decoder 524, the timing controller 526, the photo gate controller 528, the light source driver 530, the CDS/ADC circuit 536, the memory 538 and the depth error compensator 539 of FIG. 17 has the same operation and function as the row decoder 24, the timing controller 26, the photo gate controller 28, the light source driver 30, the CDS/ADC circuit 36, the memory 38 and the depth error compensator 39 of FIG. 1, so that explanation thereof is omitted for the sake of brevity.

According to an example embodiment, the three-dimensional image sensor 500 may further include a column decoder. The column decoder may decode column addresses output from the timing controller 526 and output column selection signals.

The row decoder 524 may generate control signals for controlling an operation of each pixel embodied in the pixel array 522, e.g., each pixel R, G, B and D illustrated in FIG. 16A or 16B.

The pixel array 522 includes the unit pixel array 522-1 or 522-2 illustrated in FIG. 16A or 16B. For example, the pixel array 522 includes a plurality of pixels. Each of the plurality of pixels may be arranged by mixing at least two pixels among a read pixel, a green pixel, a blue pixel, a depth pixel, a magenta pixel, a cyan pixel and a yellow pixel. Each of the plurality of pixels is arranged in a form of matrix at a cross point of a plurality of row lines and a plurality of column lines.

According to an example embodiment, the memory 538 and the depth error compensator 539 may be embodied in an image signal processor. Here, the image signal processor may interpolate each pixel signal output from each pixel of the pixel array 522 and generate a three-dimensional image signal based on each pixel information.

Figure 18:
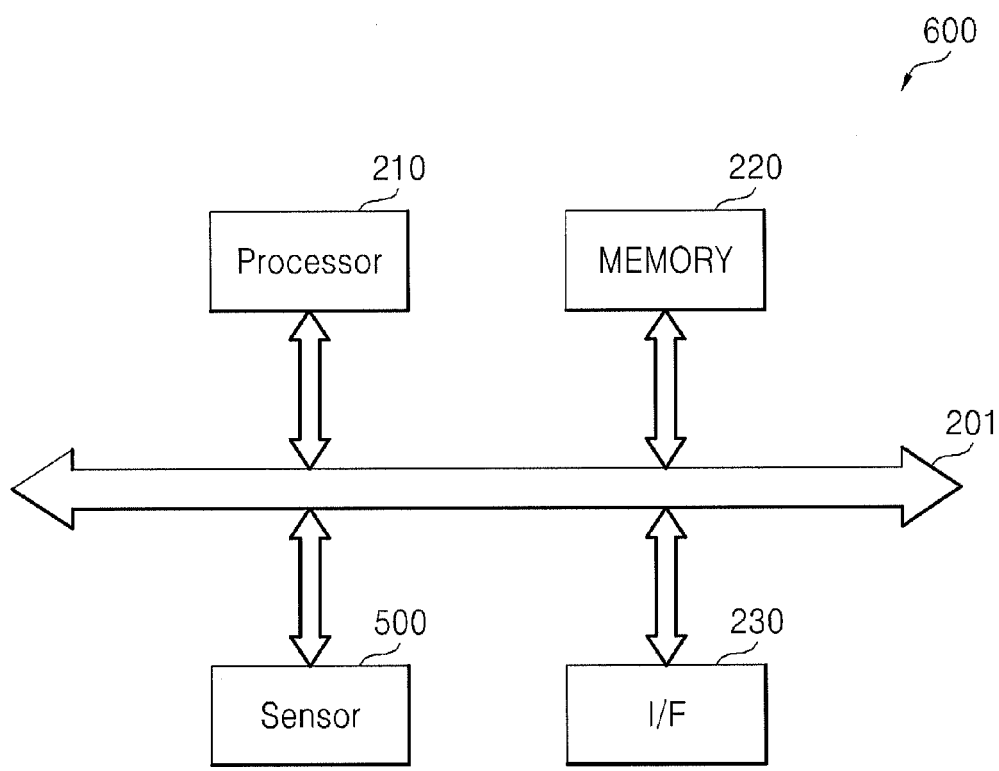
FIG. 18 is a block diagram of an image processing system including the three-dimensional image sensor illustrated in FIG. 17.

FIG. 18 is a block diagram of an image processing system including the three-dimensional image sensor illustrated in FIG. 17. Referring to FIG. 18, an image processing system 600 may include the three-dimensional image sensor 500 and a processor 210.

The processor 210 may control an operation of the three-dimensional image sensor 500. For example, the processor 210 may store a program for controlling an operation of the three-dimensional image sensor 500. According to an example embodiment, the processor 210 may access a memory (not shown) where a program for controlling an operation of the three-dimensional image sensor 500 is stored and perform the program stored in the memory.

The three-dimensional image sensor 500 may generate three-dimensional image information based on each digital pixel signal (e.g., color information or depth information) under a control of the processor 210. The generated three-dimensional image information may be displayed through a display (not shown) connected to the interface 230.

The three-dimensional image information generated by the three-dimensional image sensor 500 may be stored in the memory device 220 through a bus 201 under a control of the processor 210. The memory device 220 may be embodied in a non-volatile memory device. The interface 230 may be embodied in an interface for inputting/outputting the three-dimensional image information. According to an example embodiment, the interface 230 may be embodied in a wireless interface.

Figure 19:
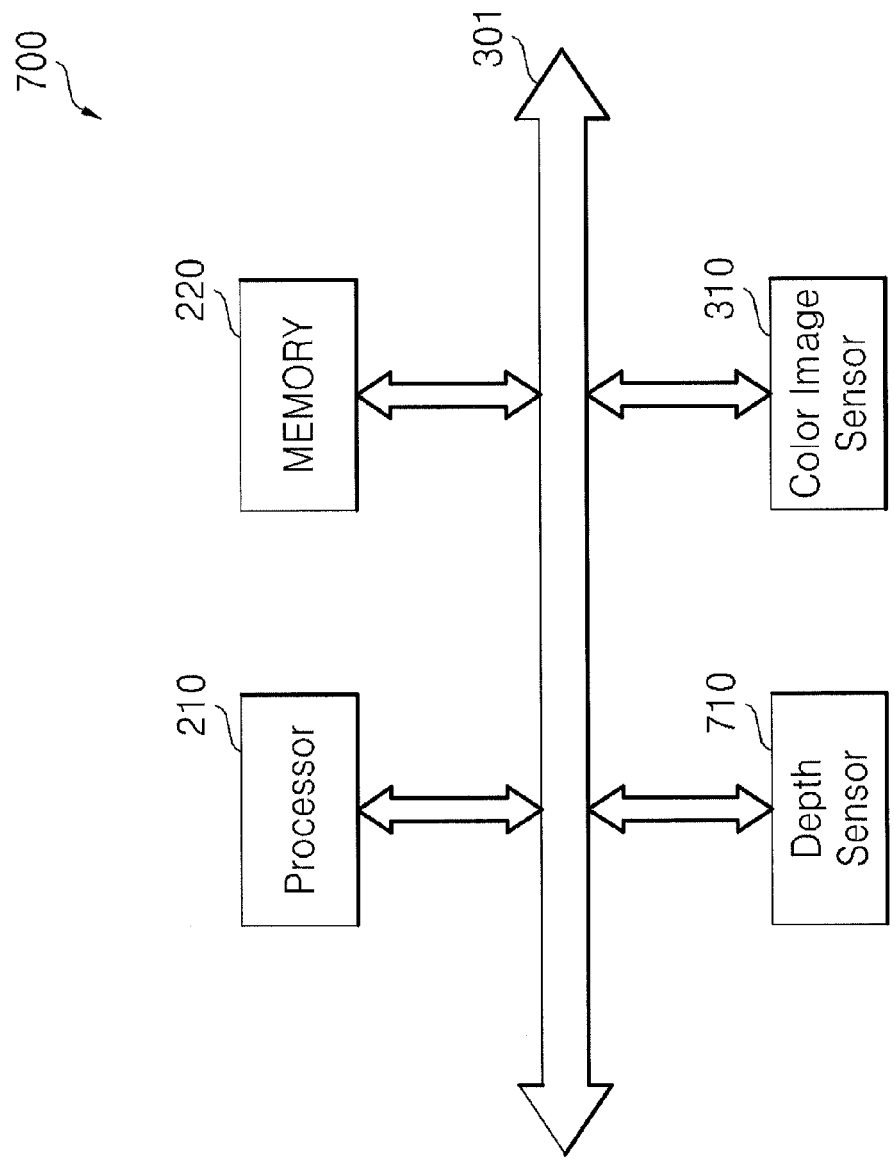
FIG. 19 is a block diagram of a color image sensor and an image processing system including a depth sensor according to an example embodiment.

FIG. 19 is a block diagram of an image processing system including a color image sensor and a depth sensor according to an example embodiment. Referring to FIG. 19, an image processing system 700 may include a depth sensor 710, a color image sensor 310 including RGB color pixels, and a processor 210. The depth sensor 710 may be the image sensor 10 or 10'.

FIG. 19 illustrates the depth sensor 710 and the color image sensor 310, which are physically divided from each other, for convenience of explanation; however, the depth sensor 710 and the color image sensor 310 may share signal processing circuits.

Here, the color image sensor 310 may mean an image sensor including a pixel array embodied in a red pixel, a green pixel and a blue pixel without including a depth pixel. Accordingly, the processor 210 may generate three-dimensional image information based on depth information, which is estimated or calculated by the depth sensor 710, and each color information output from the color image sensor 310, e.g., at least one of red information, green information, blue information, magenta information, cyan information and yellow information, and display generated three-dimensional image information through a display.

Three-dimensional image information generated by the processor 210 may be stored in the memory device 220 through a bus 301.

An image processing system illustrated in FIG. 18 or 19 may be used in a three-dimensional distance measurer, a game controller, a depth camera or a gesture sensing apparatus.

Figure 20:
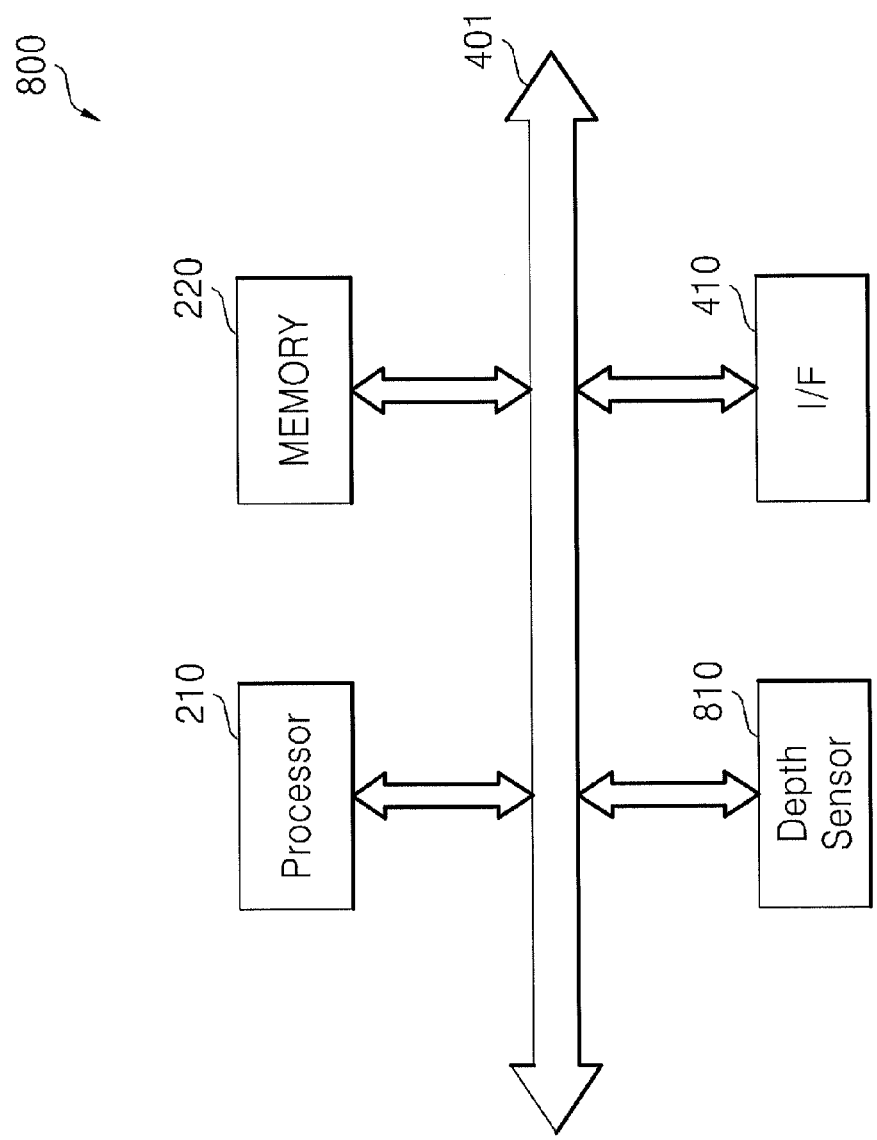
FIG. 20 is a block diagram of a signal processing system including a depth sensor according to an example embodiment.

FIG. 20 is a block diagram of a signal processing system including a depth sensor according to an example embodiment. Referring to FIG. 20, a signal processing system 800 which may operate only as a simple depth (or distance) measuring sensor includes a depth sensor 810, which may be the depth sensor 10 or 10', and the processor 210 for controlling an operation of the depth sensor 810.

The processor 210 may calculate distance information or depth information between the signal processing system 800 and a subject (or a target object) based on depth information output from the depth sensor 810. Distance information or depth information measured by the processor 210 may be stored in the memory device 220 through a bus 401.

A depth sensor according to at least some example embodiments may compensate a depth information error occurring when a target object moves quickly or laterally.

Although a few embodiments of inventive concepts have been shown and described, it will be appreciated by those skilled in the art that changes may be made in these embodiments without departing from the principles and spirit of inventive concepts, the scope of which is defined in the appended claims and their equivalents.

What is claimed is:

1. A depth information error compensation method for a depth sensor, the method comprising:
   outputting modulated light to a target object;
   first detecting, by at least one depth pixels, a plurality of first pixel signals at different detection time points in a first time interval for first phase differences of a photo gate control signal of the at least one depth pixel, the first pixel signals representing light reflected from the target object during the first time interval;

second detecting a plurality of second pixel signals at different detection time points in a second time interval for the first phase differences of the photo gate control signal the at least one depth pixel, the second pixel signals representing light reflected from the target object during the second time interval; and comparing each of the plurality of first pixel signals with each of the plurality of second pixel signals; and calculating depth information to the target object in the second time interval according to the comparing.

2. The depth information error compensation method of claim 1, wherein the first and second detecting includes accumulating electrons occurred for the first phase differences of the photo gate control signal of the depth pixel of 0°, 90°, 180° or 270° for periods of time.

3. The depth information error compensation method of claim 1, wherein the calculating depth information to the target object comprises:
generating a plurality of comparative values based on the comparing;
determining if each of the plurality of comparative values is greater than a threshold value;
calculating a second phase difference according to the determining; and
calculating the depth information based on a frequency of the reflected light during the first and second time intervals and the second phase difference.

4. The depth information error compensation method of claim 3, wherein, if the at least one depth pixel has a one-tap pixel configuration, the calculating a second phase difference includes,
calculating the second phase difference using the plurality of second pixel signals if each of the plurality of comparative values is smaller than the threshold value.

5. The depth information error compensation method of claim 3, wherein, if the at least one depth pixel has a one-tap pixel configuration and one of the plurality of comparative values is greater than the threshold value, the calculating a second phase difference includes,
compensating a depth information error to the target object using the plurality of second pixel signals, or
calculating the second phase difference using pixel signals except for the first and second pixel signals corresponding to the one comparative value exceeding the threshold.

6. The depth information error compensation method of claim 3, wherein, if the at least one depth pixel has a one-tap pixel configuration and two of the plurality of comparative values are greater than the threshold value, the calculating a second .phase difference calculates the second .phase difference using first and second pixel signals except for two first pixel signals corresponding to the two comparative values, respectively, and two second pixel signals corresponding to the two comparative values, respectively.

7. The depth information error compensation method of claim 3, wherein, if the at least one depth pixel has a one-tap pixel configuration, the calculating a second .phase difference includes,
calculating the second phase difference, if three of the plurality of comparative values are greater than the threshold value, using three second pixel signals corresponding to the three comparative values, respectively.

8. The depth information error compensation method of claim 3, wherein, if the at least one depth pixel has a one-tap pixel configuration and each of the plurality of comparative values is greater than the threshold value, the calculating a second phase difference includes,
calculating the second .phase difference using the plurality of second pixel signals.

9. The depth information error compensation method of claim 3, wherein, if the at least one depth pixel has a two-tap pixel configuration and each of the plurality of comparative values is smaller than the threshold value, the calculating a second phase difference calculates the second .phase difference using the plurality of second pixel signals.

10. The depth information error compensation method of claim 3, wherein, if the at least one depth pixel has a two-tap pixel configuration and one or two of the plurality of comparative values are greater than the threshold value, the calculating a second phase difference includes,
calculating the second .phase difference, using first and second pixel signals except for two pixel signals corresponding to the two comparative values, respectively, and two pixel signals corresponding to the two comparative values, respectively.

11. The depth information error compensation method of claim 3, wherein, if the at least one depth pixel has a two-tap pixel configuration and more than three of the plurality of comparative values are greater than the threshold value, the calculating a second phase difference includes,
calculating the second phase difference using the plurality of second pixel signals.

12. A method of operating an image sensor, the method comprising:
obtaining a plurality of first pixel signals during a first time interval, the first pixel signals representing light reflected from an object during time points in the first time interval;
obtaining a plurality of second pixel signals during a second time interval, the second pixel signals representing light reflected from the object during time points in the second time interval;
generating values based on the plurality of first pixel signals and the plurality of second pixel signals;
determining if at least one of the values is below a threshold;
determining a phase difference based on whether at least one of the values exceeds the threshold, the phase difference representing a phase difference between at least one of the first and second pixel signals and a control signal generated by the image sensor; and
calculating depth information to the object in the second time interval according to the determined phase difference.

13. The method of claim 12, wherein the determining if at least one of the values is below a threshold includes determining that at least one of the values is below the threshold if the object moves during at least one of the first interval and second time intervals.

14. The method of claim 12, wherein the determining a phase difference includes determining the phase difference based on a number of values below the threshold.

15. The method of claim 14, wherein the determining a phase difference determines at least one value is below the threshold and determines the phase difference based on the plurality of second pixel signals.

* * * * *